(12) United States Patent
Gutekunst et al.

(10) Patent No.: US 12,492,413 B2
(45) Date of Patent: Dec. 9, 2025

(54) GENETICALLY MODIFIED PHOTOTROPHIC CELL FOR IN-VIVO PRODUCTION OF HYDROGEN

(71) Applicant: University of Kassel, Kassel (DE)

(72) Inventors: Kirstin Gutekunst, Kiel (DE); Jens Appel, Kiel (DE)

(73) Assignee: University of Kassel, Kassel (DE)

( * ) Notice: Subject to any disclaimer, the term of this patent is extended or adjusted under 35 U.S.C. 154(b) by 636 days.

(21) Appl. No.: 17/781,077

(22) PCT Filed: Dec. 2, 2020

(86) PCT No.: PCT/EP2020/084252
§ 371 (c)(1),
(2) Date: May 31, 2022

(87) PCT Pub. No.: WO2021/110738
PCT Pub. Date: Jun. 10, 2021

(65) Prior Publication Data
US 2023/0002791 A1 Jan. 5, 2023

(30) Foreign Application Priority Data
Dec. 2, 2019 (DE) .................... 10 2019 132 671.0

(51) Int. Cl.
| | |
|---|---|
| C12P 3/00 | (2006.01) |
| C07K 14/195 | (2006.01) |
| C07K 14/405 | (2006.01) |
| C12N 1/20 | (2006.01) |
| C12N 9/02 | (2006.01) |
| C12N 15/62 | (2006.01) |
| C12N 15/74 | (2006.01) |

(52) U.S. Cl.
CPC .............. *C12P 3/00* (2013.01); *C07K 14/195* (2013.01); *C07K 14/405* (2013.01); *C12N 1/20* (2013.01); *C12N 9/0067* (2013.01); *C12N 15/625* (2013.01); *C12N 15/74* (2013.01); *C12Y 112/01002* (2013.01); *C07K 2319/00* (2013.01)

(58) Field of Classification Search
CPC ....................................................... C12P 3/00
See application file for complete search history.

(56) References Cited

U.S. PATENT DOCUMENTS 6,410,258 B1 6/2002 McTavish

FOREIGN PATENT DOCUMENTS

| WO | WO-2009020584 A1 * | 2/2009 | ........... C07K 14/415 |
| WO | 2010137019 A1 | 12/2010 | |

OTHER PUBLICATIONS

International Search Report issued on Feb. 22, 2021, in International Application No. PCT/EP2020/084252.

Wuchukwu, Ifeyinwa Jane, "Protein engineering for the Enhanced Photo-production of Protein engineering for the Enhanced Photo-production of Hydrogen by Cyanobacterial Photosystem I Hydrogen by Cyanobacterial Photosystem I", May 1, 2011 (May 1, 2011), Retrieved from the Internet: https://trace.tennessee.edu/utk_graddiss/982/, [retrieved on Feb. 11, 2021], XP055775048, the whole document.

Krassen, Henning, et al., "Photosynthetic Hydrogen Production by a Hybrid Complex of Photosystem I and [NiFe]-Hydrogenase", ACS NANO, vol. 3, No. 12, Dec. 22, 2009 (Dec. 22, 2009), pp. 4055-4061, DOI: 10.1021/nn900748j, http://dx.doi.org/10.1021/nn900748j, ISSN: 1936-0851, XP055774932, cited in the application—p. 4056—left-hand column.

Ihara, Masaki, et al., "Light-driven hydrogen production by a hybrid complex of a [NiFe]-hydrogenase and the cyanobacterial photosystem I", Photochemistry and Photobiology, Wiley-Blackwell Publishing, Inc, US, vol. 82, No. 3, May 1, 2006 (May 1, 2006), pp. 676-682, [retrieved on Mar. 16, 2006], DOI: 10.1562/2006-01-16-RA-778, http://dx.doi.org/10.1562/2006-01-16-RA-778, ISSN: 0031-8655, XP002497930, cited in the application—the whole document.

Ihara, Masaki, et al., "Photoinduced hydrogen production by direct electron transfer from photosystem I cross-linked with cytochrome c3 to [NiFe]-hydrogenase", Photochemistry and Photobiology, Nov. 1, 2006 Wiley-Blackwell Publishing, Inc, US, vol. 82, No. 6, Nov. 1, 2006 (Nov. 1, 2006), pp. 1677-1685, [retrieved on Jul. 12, 2006], http://dx.doi.org/10.1562/2006-05-07-RA-893, ISSN 0031-8655, XP002497931.

Martin, Winkler, et al., "Light driven hydrogen production in protein based semi-artificial systems", Bioresource Technology, May 8, 2011 Elsevier, Amsterdam, NL—ISSN 0960-8524, vol. 102, Nr: 18, pp. 8493-8500, [retrieved on May 19, 2011], DOI: 10.1016/J.BIORTECH.2011.05.019, http://dx.doi.org/10.1016/j.biortech.2011.05.019, XP028266365.

Martin, Baker A, et al., "A Review of Hydrogen Production by Photosynthetic Organisms Using Whole-Cell and Cell-Free Systems", Applied Biochemistry and Biotechnology, Humana Press Inc, New York, vol. 183, No. 2, Sep. 14, 2017 (Sep. 14, 2017), pp. 503-519, [retrieved on Sep. 14, 2017], DOI: 10.1007/S12010-017-2576-3, http://dx.doi.org/10.1007/s12010-017-2576-3, ISSN: 0273-2289, XP036334040.

(Continued)

*Primary Examiner* — Albert M Navarro
(74) *Attorney, Agent, or Firm* — Patent Central LLC; Stephan A. Pendorf

(57) ABSTRACT

A genetically modified phototrophic cell for in-vivo production of hydrogen. The phototrophic cell has been genetically modified to the effect that a) at least one of the native photosystem I components has been deleted, b) the native hydrogenase has been deleted, and c) at least one fusion protein is expressed, comprising i. a hydrogenase or hydrogenase component and ii. at least one PSI component, with the proviso that the PSI is complemented by expression of the at least one fusion protein, and the hydrogenase component itself, or together with at least one further hydrogenase component expressibly introduced into the cell, has hydrogenase activity.

15 Claims, 10 Drawing Sheets

Figure 1:
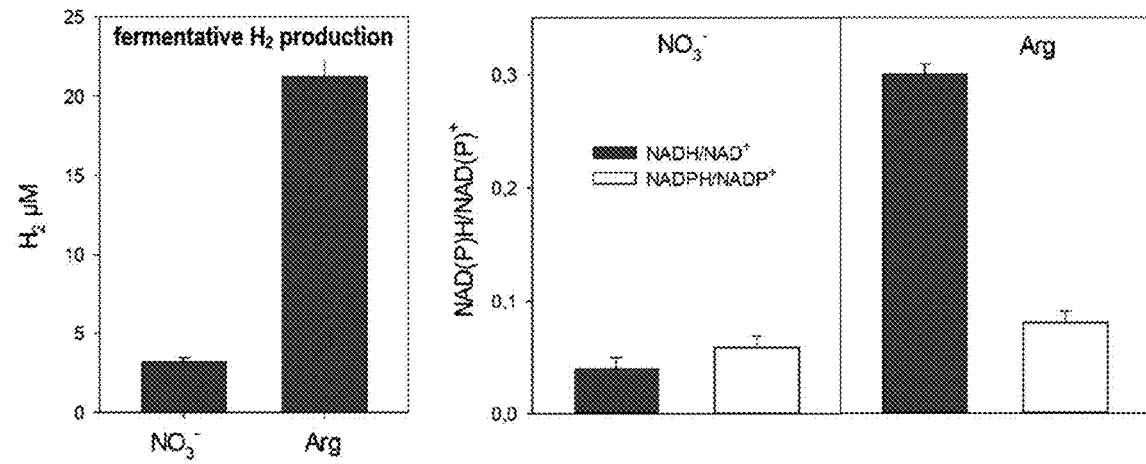

Specification includes a Sequence Listing.

(56) References Cited

OTHER PUBLICATIONS

Kajan, Srirangan, et al., "Biochemical and genetic engineering strategies to enhance hydrogen production in photosynthetic algae and cyanobacteria", Bioresource Technology, vol. 102, No. 18, Mar. 31, 2011 (Mar. 31, 2011), pp. 8589-8604, [retrieved on Mar. 31, 2011], DOI: 10.1016/J.BIORTECH.2011.03.087, http://dx.doi.org/10.1016/j.biortech.2011.03.087, ISSN: 0960-8524, XP028266377.

Jaoon, Young Hwan Kim, et al., "Recent progress in hydrogenase and its biotechnological application for viable hydrogen technology", Korean Journal of Chemical Engineering, Springer US, Boston, vol. 30, No. 1, Dec. 21, 2012 (Dec. 21, 2012), pp. 1-10, DOI: 10.1007/SII814-012-0208-8, http://dx.doi.org/10.1007/s11814-012-0208-8, ISSN: 1975-7220, XP035159843.

Appel, Jens, et al., "Cyanobacterial in vivo solar hydrogen production using a photosystem I-hydrogenase (PsaD-HoxYH) fusion complex", Nature Energy, Nature Publishing Group UK, London, vol. 5, No. 6, May 4, 2020 (May 4, 2020), pp. 458-467 DOI: 10.1038/S41560-020-0609-6, http://dx.doi.org/10.1038/s41560-020-0609-6, XP037173361, the whole document.

\* cited by examiner

Table 1:

| Primer | Sequence | Amplified fragment |
|---|---|---|
| Deletion of all Hox genes: | | |
| hoxout1 | CGTTGTAAAACGACGGCCAGTGCCATTATCTGCCAGTGAAGCCCTT CTTTCTGGCTGATGATGGGCGATGATAAAAGATGATTGGAGAGCCTA | Upstream recombination site |
| hoxin1 Km | CCACGTTGTGTCTCAAAATCTGAT | Km cassette |
| Km1 | ATCGCCCATCATCCAGCCAGAAAG | |
| Km2 | ATCAGAGATTTGAGACACAACGTGGGCATCACCGAGGCATATCT | Downstream recombination site |
| hoxin2Km | GGAAACAGCTATGACCATGATTACGGTTCAGCAGCAACTAGCCCTT | |
| hoxout2 | | |
| Expression of HoxYH in Hox deletion strain: | | |
| pB-Trc-fw | TAGGCTCTCCAATCATCTTTATCGAAGGGCACTCCGTTCTGAA GGGTGGCTCCAGTAGCCATATGATTAATCTCTTGAAATTGTATCCGCTCACA | trc promoter |
| pB-Trc-rev NEU | | |
| pB-NStrep-YH-fw NEU | ATGGCTAGCTGGAGCCACCGCAGTTCGAAAAAGGCGCCGCTAAAATTCGTTTGCTACCGTT | HoxY and HoxH with N-terminal Strep tag |
| pB-NStrep-YH-rev | GGTTCGTGCTTCATCCGTCGACTTAATCCGCTGGATGGACT | |
| pB-Gm-fw | AGTCCATCCAGCGGATTAAGTCGACGGATGAAGGCACGAACC | Gm cassette |
| pB-Gm-rev NEU | AAGCTATGGAAACCCGACAGTCGACGAATTGTTAGGTGGCG | |
| box-out1pB | CTATAGGGCGAATTGGGTACTTATCTGCCAGTCAAGCCCTT | Upstream recombination site |
| hoxin1pB | AGATATGCCTCGGTGATGCCGAATTCGATAAAGTGATTGGGAGAGCCTA | |
| hoxin2pB | TAGGCTCTCCAATCACTCTTTATCGAATTCGGCATCACCGAGGGCATATCT | Downstream recombination site |
| hoxout2pB | AGGGAACAAAAGCTGGAGCTGTTCAGCGAGCAACTAGCCCTTT | |
| Deletion of PsaD: | | |
| PsaDout1 | CGTTGTAAAACGACGGCCAGTGCCAACCGGATTTGTAGGTTGAACT | Upstream recombination site |
| psaDin1 | GGTTCGTGCCTTCATCCGTCGACAGGGATGAAAATGAAATTTCAT | |
| Gm1 | GTCGACGGATGAAGGCACGAACC | Gm cassette |
| Gm2 | GTCGACGAATTGTTAGGTGGCG | |
| psaDin2 | CGCCACCTAACAATTCGGTCGACTTCCTGGCTCTACTTGCTTGCG | Downstream recombination site |
| PsaDout2 | GGAAACAGCTATGACCATGATTACGCGAGAAAACTATAGCGACCAAT | |
| Fusion of HoxY to PsaD: | | |
| Eco-PsaDout1 | ACTCTCTACTGTTTCTCCATACCCGTTTTTTGGGCTAGC ACCGGGTTTGTAGGTTGAACT | 5' part of PsaD (upstream recombination site) |
| PsaD | CGGTAGCAAAACGAATTTTAGCTTCAGGAGAAACGCCATGGC GCTGATGGCGTTTCCGTGAAGCTAAAATTCGTTTGCTACCGT | |
| HoxY-PsaD | GCCGATGGCGTTTCTCCTGAAGCTAAAATTCGTTTGCTACCGT | HoxY to HoxH |
| PsaD-HoxY | TAATTCTTTTTCGTCGACGTCTGAATGTTTTTGTTAATCCC | |
| Em-HoxH | CGGAAGCAAGTAGAGCCAGGAAGTCGACTTACTTATTAAATAATT | Em cassette |
| PsaD-Em | AACAAAAACATTCAGACGHTCGACAAAAAGAAATTAGATAAA | |
| HoxH-Em | AATTATTTAATAAGTAAGTCGACTTCCTGGCTCTACTTGCTTGCG | |
| Em-PsaD | CGAAGCAGGGTTATGCAGCGGAAAGTATACCTTAACCGAC | 3' part of PsaD (downstream recombination site) |
| NueI-PsaDout2 | AACCGAGAAAACTATAGCGACC | |

Fig. 11

SEQUENCE LISTING

```
<160> NUMBER OF SEQ ID NOS: 31

<210> SEQ ID NO 1
<211> LENGTH: 46
<212> TYPE: DNA
<213> ORGANISM: Artificial Sequence
<220> FEATURE:
<223> OTHER INFORMATION: Primer hoxout1

<400> SEQUENCE: 1
cgttgtaaaa cgacggccag tgccattatc tgccagtgaa gccctt          46

<210> SEQ ID NO 2
<211> LENGTH: 50
<212> TYPE: DNA
<213> ORGANISM: Artificial Sequence
<220> FEATURE:
<223> OTHER INFORMATION: Primer hoxin1Km

<400> SEQUENCE: 2
ctttctggct ggatgatggg gcgatgataa aagatgattg ggagagccta      50

<210> SEQ ID NO 3
<211> LENGTH: 26
<212> TYPE: DNA
<213> ORGANISM: Artificial Sequence
<220> FEATURE:
<223> OTHER INFORMATION: Primer Km1

<400> SEQUENCE: 3
ccacgttgtg tctcaaaatc tctgat                                26

<210> SEQ ID NO 4
<211> LENGTH: 25
<212> TYPE: DNA
<213> ORGANISM: Artificial Sequence
<220> FEATURE:
<223> OTHER INFORMATION: Primer Km2

<400> SEQUENCE: 4
atcgccccat catccagcca gaaag                                 25
```

```
<210> SEQ ID NO 5
<211> LENGTH: 47
<212> TYPE: DNA
<213> ORGANISM: Artificial Sequence
<220> FEATURE:
<223> OTHER INFORMATION: Primer hoxin2Km

<400> SEQUENCE: 5
atcagagatt ttgagacaca acgtggggca tcaccgaggg catatct        47

<210> SEQ ID NO 6
<211> LENGTH: 48
<212> TYPE: DNA
<213> ORGANISM: Artificial Sequence
<220> FEATURE:
<223> OTHER INFORMATION: Primer hoxout2

<400> SEQUENCE: 6
ggaaacagct atgaccatga ttacggttca gccagcaact agcccttt       48

<210> SEQ ID NO 7
<211> LENGTH: 47
<212> TYPE: DNA
<213> ORGANISM: Artificial Sequence
<220> FEATURE:
<223> OTHER INFORMATION: Primer pB-Trc-fw

<400> SEQUENCE: 7
taggctctcc caatcatctt ttatcgaagg cgcactcccg ttctgga        47

<210> SEQ ID NO 8
<211> LENGTH: 55
<212> TYPE: DNA
<213> ORGANISM: Artificial Sequence
<220> FEATURE:
<223> OTHER INFORMATION: Primer pB-Trc-rev NEU

<400> SEQUENCE: 8
gggtggctcc agctagccat atgattaatc tccttgaaat tgttatccgc tcaca    55

<210> SEQ ID NO 9
<211> LENGTH: 63
<212> TYPE: DNA
<213> ORGANISM: Artificial Sequence
<220> FEATURE:
<223> OTHER INFORMATION: Primer pB-NStrep-YH-fw NEU

<400> SEQUENCE: 9
atggctagct ggagccaccc gcagttcgaa aaaggcgccg ctaaaattcg ttttgctacc    60
gtt                                                                 63

<210> SEQ ID NO 10
<211> LENGTH: 43
<212> TYPE: DNA
<213> ORGANISM: Artificial Sequence
<220> FEATURE:
<223> OTHER INFORMATION: Primer pB-NStrep-YH-rev

<400> SEQUENCE: 10
ggttcgtgcc ttcatccgtc gacttaatcc cgctggatgg act        43

<210> SEQ ID NO 11
<211> LENGTH: 43
<212> TYPE: DNA
<213> ORGANISM: Artificial Sequence
<220> FEATURE:
```

<223> OTHER INFORMATION: Primer pB-Gm-fw

<400> SEQUENCE: 11
agtccatcca gcgggattaa gtcgacggat gaaggcacga acc                43

<210> SEQ ID NO 12
<211> LENGTH: 44
<212> TYPE: DNA
<213> ORGANISM: Artificial Sequence
<220> FEATURE:
<223> OTHER INFORMATION: Primer pB-Gm-rev NEU

<400> SEQUENCE: 12
aaggctatgg aaacccgaca ggtcgaccga attgttaggt ggcg              44

<210> SEQ ID NO 13
<211> LENGTH: 41
<212> TYPE: DNA
<213> ORGANISM: Artificial Sequence
<220> FEATURE:
<223> OTHER INFORMATION: Primer hox-out1pB

<400> SEQUENCE: 13
ctatagggcg aattgggtac ttatctgcca gtgaagccct t                 41

<210> SEQ ID NO 14
<211> LENGTH: 52
<212> TYPE: DNA
<213> ORGANISM: Artificial Sequence
<220> FEATURE:
<223> OTHER INFORMATION: Primer hoxin1pB

<400> SEQUENCE: 14
agatatgccc tcggtgatgc cgaattcgat aaagatgat tgggagagcc ta      52

<210> SEQ ID NO 15
<211> LENGTH: 52
<212> TYPE: DNA
<213> ORGANISM: Artificial Sequence
<220> FEATURE:
<223> OTHER INFORMATION: Primer hoxin2pB

<400> SEQUENCE: 15
taggctctcc caatcatctt ttatcgaatt cggcatcacc gagggcatat ct     52

<210> SEQ ID NO 16
<211> LENGTH: 43
<212> TYPE: DNA
<213> ORGANISM: Artificial Sequence
<220> FEATURE:
<223> OTHER INFORMATION: Primer hoxout2pB

<400> SEQUENCE: 16
agggaacaaa agctggagct gttcagccag caactagccc ttt               43

<210> SEQ ID NO 17
<211> LENGTH: 46
<212> TYPE: DNA
<213> ORGANISM: Artificial Sequence
<220> FEATURE:
<223> OTHER INFORMATION: Primer PsaDout1

<400> SEQUENCE: 17
cgttgtaaaa cgacggccag tgccaaccgg gtttgtaggt tgaact            46

```
<210> SEQ ID NO 18
<211> LENGTH: 45
<212> TYPE: DNA
<213> ORGANISM: Artificial Sequence
<220> FEATURE:
<223> OTHER INFORMATION: Primer psaDin1

<400> SEQUENCE: 18
ggttcgtgcc ttcatccgtc gacagggatg aaaatggaat ttcat          45

<210> SEQ ID NO 19
<211> LENGTH: 23
<212> TYPE: DNA
<213> ORGANISM: Artificial Sequence
<220> FEATURE:
<223> OTHER INFORMATION: Primer Gm1

<400> SEQUENCE: 19
gtcgacggat gaaggcacga acc                                  23

<210> SEQ ID NO 20
<211> LENGTH: 23
<212> TYPE: DNA
<213> ORGANISM: Artificial Sequence
<220> FEATURE:
<223> OTHER INFORMATION: Primer Gm2

<400> SEQUENCE: 20
gtcgaccgaa ttgttaggtg gcg                                  23

<210> SEQ ID NO 21
<211> LENGTH: 45
<212> TYPE: DNA
<213> ORGANISM: Artificial Sequence
<220> FEATURE:
<223> OTHER INFORMATION: Primer psaDin2

<400> SEQUENCE: 21
cgccacctaa caattcggtc gacttcctgg ctctacttgc ttgcg          45

<210> SEQ ID NO 22
<211> LENGTH: 47
<212> TYPE: DNA
<213> ORGANISM: Artificial Sequence
<220> FEATURE:
<223> OTHER INFORMATION: Primer PsaDout2

<400> SEQUENCE: 22
ggaaacagct atgaccatga ttacgcgaga aaactatagc gaccaat        47

<210> SEQ ID NO 23
<211> LENGTH: 61
<212> TYPE: DNA
<213> ORGANISM: Artificial Sequence
<220> FEATURE:
<223> OTHER INFORMATION: Primer Eco-PsaDout1

<400> SEQUENCE: 23
actctctact gtttctccat acccgttttt ttgggctagc accgggtttg taggttgaac   60
t                                                                  61

<210> SEQ ID NO 24
<211> LENGTH: 43
<212> TYPE: DNA
<213> ORGANISM: Artificial Sequence
<220> FEATURE:
```

<223> OTHER INFORMATION: Primer HoxY-PsaD

<400> SEQUENCE: 24
cggtagcaaa acgaatttta gcttcaggga aaacgccatc ggc                43

<210> SEQ ID NO 25
<211> LENGTH: 44
<212> TYPE: DNA
<213> ORGANISM: Artificial Sequence
<220> FEATURE:
<223> OTHER INFORMATION: Primer PsaD-HoxY

<400> SEQUENCE: 25
gccgatggcg ttttccctga agctaaaatt cgttttgcta ccgt               44

<210> SEQ ID NO 26
<211> LENGTH: 46
<212> TYPE: DNA
<213> ORGANISM: Artificial Sequence
<220> FEATURE:
<223> OTHER INFORMATION: Primer Em-HoxH

<400> SEQUENCE: 26
taatttcttt tttcgtcgac cgtctgaatg tttttgttt aatccc              46

<210> SEQ ID NO 27
<211> LENGTH: 45
<212> TYPE: DNA
<213> ORGANISM: Artificial Sequence
<220> FEATURE:
<223> OTHER INFORMATION: Primer PsaD-Em

<400> SEQUENCE: 27
cgcaagcaag tagagccagg aagtcgactt acttattaaa taatt              45

<210> SEQ ID NO 28
<211> LENGTH: 46
<212> TYPE: DNA
<213> ORGANISM: Artificial Sequence
<220> FEATURE:
<223> OTHER INFORMATION: Primer HoxH-Em

<400> SEQUENCE: 28
aaacaaaaaa cattcagacg gtcgacgaaa aagaaatta gataaa              46

<210> SEQ ID NO 29
<211> LENGTH: 45
<212> TYPE: DNA
<213> ORGANISM: Artificial Sequence
<220> FEATURE:
<223> OTHER INFORMATION: Primer Em-PsaD

<400> SEQUENCE: 29
aattatttaa taagtaagtc gacttcctgg ctctacttgc ttgcg              45

<210> SEQ ID NO 30
<211> LENGTH: 62
<212> TYPE: DNA
<213> ORGANISM: Artificial Sequence
<220> FEATURE:
<223> OTHER INFORMATION: Primer NaeI-PsaDout2

<400> SEQUENCE: 30
cgaagcaggg ttatgcagcg gaaagtatac cttaaccgcc aaccgagaaa actatagcga    60
cc                                                                   62

<210> SEQ ID NO 31
<211> LENGTH: 11230
<212> TYPE: DNA
<213> ORGANISM: Artificial Sequence
<220> FEATURE:
<223> OTHER INFORMATION: Plasmid

<400> SEQUENCE: 31

| | | | | | |
|---|---|---|---|---|---|
| gatttatctt | cgtttcctgc | aggttttttgt | tctgtgcagt | tgggttaaga | atactgggca | 60 |
| atttcatgtt | tcttcaacac | tacatatgcg | tatatatacc | aatctaagtc | tgtgctcctt | 120 |
| ccttcgttct | tccttctgtt | cggagattac | cgaatcaaaa | aaatttcaaa | gaaaccgaaa | 180 |
| tcaaaaaaaa | gaataaaaaa | aaatgatga | attgaattga | aaagctgtgg | tatggtgcac | 240 |
| tctcagtaca | atctgctctg | atgccgcata | gttaagccag | ccccgacacc | cgccaacacc | 300 |
| cgctgacgcg | ccctgacggg | cttgtctgct | cccggcatcc | gcttacagac | aagctgtgac | 360 |
| cgtctccggg | agctgcatgt | gtcagaggtt | ttcaccgtca | tcaccgaaac | gcgcgagacg | 420 |
| aaagggcctc | gtgatacgcc | tatttttata | ggttaatgtc | atgataataa | tggtttctta | 480 |
| gtatgatcca | atatcaaagg | aaatgatagc | attgaaggat | gagactaatc | caattgagga | 540 |
| gtggcagcat | atagaacagc | taaagggtag | tgctgaagga | agcatacgat | accccgcatg | 600 |
| gaatgggata | atatcacagg | aggtactaga | ctacctttca | tcctacataa | atagacgcat | 660 |
| ataagtacgc | atttaagcat | aaacacgcac | tatgccgttc | ttctcatgta | tatatatata | 720 |
| caggcaacac | gcagatatag | gtgcgacgtg | aacagtgagc | tgtatgtgcg | cagctcgcgt | 780 |
| tgcattttcg | gaagcgctcg | ttttcggaaa | cgctttgaag | ttcctattcc | gaagttccta | 840 |
| ttctctagaa | agtataggaa | cttcagagcg | cttttgaaaa | ccaaaagcgc | tctgaagacg | 900 |
| cactttcaaa | aaaccaaaaa | cgcaccggac | tgtaacgagc | tactaaaata | ttgcgaatac | 960 |
| cgcttccaca | acattgctc | aaagtatct | ctttgctata | tatctctgtg | ctatatccct | 1020 |
| atataaccta | cccatccacc | tttcgctcct | tgaacttgca | tctaaactcg | acctctacat | 1080 |
| ttttttatgtt | tatctctagt | attactcttt | agacaaaaaa | attgtagtaa | gaactattca | 1140 |
| tagagtgaat | cgaaaacaat | acgaaaatgt | aaacatttcc | tatacgtagt | atatagagac | 1200 |
| aaaatagaag | aaaccgttca | taatttttctg | accaatgaag | aatcatcaac | gctatcactt | 1260 |
| tctgttcaca | aagtatgcgc | aatccacatc | ggtatagaat | ataatcgggg | atgccttat | 1320 |
| cttgaaaaaa | tgcacccgca | gcttcgctag | taatcagtaa | acgcgggaag | tggagtcagg | 1380 |
| cttttttttat | ggaagagaaa | atagacacca | aagtagcctt | cttctaacct | taacggacct | 1440 |
| acagtgcaaa | aagttatcaa | gagactgcat | tatagagcgc | acaaaggaga | aaaaagtaa | 1500 |
| tctaagatgc | tttgttagaa | aaatagcgct | ctcgggatgc | attttgtag | aacaaaaaag | 1560 |
| aagtatagat | tctttgttgg | taaaatagcg | ctctcgcgtt | gcatttctgt | tctgtaaaaa | 1620 |
| tgcagctcag | attctttgtt | tgaaaaatta | gcgctctcgc | gttgcatttt | tgttttacaa | 1680 |
| aaatgaagca | cagattcttc | gttggtaaaa | tagcgctttc | gcgttgcatt | tctgttctgt | 1740 |
| aaaaatgcag | ctcagattct | tgttttgaaa | aattagcgct | ctcgcgttgc | attttttgttc | 1800 |
| tacaaaatga | agcacagatg | cttcgttcag | gtggcacttt | tcggggaaat | gtgcgcggaa | 1860 |
| cccctatttg | tttattttttg | aagagtatga | gtattcaacc | gaattgacat | aagcctgttc | 1920 |
| ggttcgtaaa | ctgtaatgca | agtagcgtat | gcgctcacgc | aactggtcca | gaaccttgac | 1980 |
| cgaacgcagc | ggtggtaacg | gcgcagtggc | ggttttcatg | gcttgttatg | actgtttttt | 2040 |

-continued

```
tgtacagtct atgcctcggg catccaagca gcaagcgcgt tacgccgtgg gtcgatgttt    2100
gatgttatgg agcagcaacg atgttacgca gcagcaacga tgttacgcag cagggcagtc    2160
gccctaaaac aaagttaggt ggctcaagta tgggcatcat tcgcacatgt aggctcggcc    2220
ctgaccaagt caaatccatg cgggctgctc ttgatctttt cggtcgtgag ttcggagacg    2280
tagccaccta ctcccaacat cagccggact ccgattacct cgggaacttg ctccgtagta    2340
agacattcat cgcgcttgct gccttcgacc aagaagcggt tgttggcgct ctcgcggctt    2400
acgttctgcc caggtttgag cagccgcgta gtgagatcta tatctatgat ctcgcagtct    2460
ccggcgagca ccggaggcag ggcattgcca ccgcgctcat caatctcctc aagcatgagg    2520
ccaacgcgct tggtgcttat gtgatctacg tgcaagcaga ttacggtgac gatcccgcag    2580
tggctctcta tacaaagttg gcatacggga agaagtgat gcactttgat atcgacccaa    2640
gtaccgccac ctaacaattc gttcaagccg agatcggctt cccggccgcg gagttgttcg    2700
gtaaattgtc acaacgccgc ggccaattcg catcgattgt cagaccaagt ttactcatat    2760
ctaggtgaag atccttttg ataatctcat gaccaaaatc ccttaacgtg agttttcgtt    2820
ccactgagcg tcagaccccg tagaaaagat caaggatct tcttgagatc cttttttct    2880 gcgcgtaatc tgctgcttgc aaacaaaaaa accaccgcta ccagcggtgg tttgtttgcc    2940
ggatcaagag ctaccaactc ttttccgaa ggtaactggc ttcagcagag cgcagatacc    3000
aaatactgtc cttctagtgt agccgtagtt aggccaccac ttcaagaact ctgtagcacc    3060
gcctacatac ctcgctctgc taatcctgtt accagtggct gctgccagtg cgataagtc    3120 gtgtcttacc gggttggact caagacgata gttaccggat aaggcgcagc ggtcgggctg    3180
aacggggggt tcgtgcacac agcccagctt ggagcgaacg acctacaccg aactgagata    3240
cctacagcgt gagctatgag aaagcgccac gcttcccgaa gggagaaagg cggacaggta    3300
tccggtaagc ggcagggtcg aacaggaga gcgcacgagg gagcttccag ggggaaacgc    3360
ctggtatctt tatagtcctg tcgggtttcg ccacctctga cttgagcgtc gatttttgtg    3420
atgctcgtca ggggggcgga gcctatggaa aaacgccagc aacgcggcct ttttacggtt    3480
cctggccttt tgctggcctt tgctcacat gttctttcct gcgttatccc ctgattctgt    3540
ggataaccgt attaccgcct ttgagtgagc tgataccgct cgccgcagcc gaacgaccga    3600
gcgcagcgag tcagtgagcg aggaagcgga agagcgccca atacgcaaac cgcctctccc    3660
cgcgcgttgg ccgattcatt aatgcagctg gctcatgtt tgacagctta atcgatgcat    3720
aatgtgcctg tcaaatggac gaagcaggga ttctgcaaac cctatgctac tccgtcaagc    3780
cgtcaattgt ctgattcgtt accaattatg acaacttgac ggctacatca ttcactttt    3840 cttcacaacc ggcacggaac tcgctcgggc tggccccggt gcatttttta aatacccgcg    3900
agaaatagag ttgatcgtca aaaccaacat tgcgaccgac ggtggcgata ggcatccggg    3960
tggtgctcaa aagcagcttc gcctggctga tacgttggtc ctcgcgccag cttaagacgc    4020
taatccctaa ctgctggcgg aaaagatgtg acagacgcga cggcgacaag caaacatgct    4080
gtgcgacgct ggcgatatca aaattgctgt ctgccaggtg atcgctgatg tactgacaag    4140
cctcgcgtac ccgattatcc atcggtggat ggagcgactc gttaatcgct tccatgcgcc    4200
gcagtaacaa ttgctcaagc agatttatcg ccagcagctc cgaatagcgc ccttcccctt    4260
gcccggcgtt aatgatttgc ccaaacaggt cgctgaaatg cggctggtgc gcttcatccg    4320
ggcgaaagaa cccgtattg gcaaatattg acggccagtt aagccattca tgccagtagg    4380
cgcgcggacg aaagtaaacc cactggtgat accattcgcg agcctccgga tgacgaccgt    4440
```

```
agtgatgaat ctctcctggc gggaacagca aaatatcacc cggtcggcaa acaaattctc    4500
gtccctgatt tttcaccacc ccctgaccgc gaatggtgag attgagaata taacctttca    4560
ttcccagcgg tcggtcgata aaaaaatcga gataaccgtt ggcctcaatc ggcgttaaac    4620
ccgccaccag atgggcatta aacgagtatc ccggcagcag gggatcattt tgcgcttcag    4680
ccatactttt catactcccg ccattcagag aagaaaccaa ttgtccatat tgcatcagac    4740
attgccgtca ctgcgtcttt tactggctct tctcgctaac caaaccggta accccgctta    4800
ttaaaagcat tctgtaacaa agcgggacca aagccatgac aaaaacgcgt aacaaaagtg    4860
tctataatca cggcagaaaa gtccacattg attatttgca cggcgtcaca ctttgctatg    4920
ccatagcatt tttatccata agattagcgg atcctacctg acgcttttta tcgcaactct    4980
ctactgtttc tccatacccg ttttttgggg ctagcaccgg gtttgtaggt tgaactcaga    5040
ccaccattta cgcagaaaac cctgcatagt ctgcaaaatc gccgttggat tggacacaga    5100
agtccccata atctccttgc caaaactcct atgattctat ctcgattaca caacctact    5160 gggcgttcta acagagatgc tctacccatt gtcctgggga gcagaatttg gtgaaatgtt    5220
acagttcttg acaaagccag atggtaaccg taggtcagtg gtaggattcc ctaaaatacc    5280
ttatgaaatt ccatttcat ccctaccggg tttgtaggtt gaactcagac caccatttac    5340
gcagaaaacc ctgcatagtc tgcaaaatcg ccgttggatt ggacacagaa gtccccataa    5400
tctccttgcc aaaactccta tgattctatc tcgattacac aacctactg gcgttctaa     5460 cagagatgct ctacccattg tcctggggag cagaatttgg tgaaatgtta cagttcttga    5520
caaagccaga tggtaaccgt aggtcagtgg taggattccc taaaatacct tatgaaattc    5580
cattttcatc cctatgacag aactctctgg acaaccgcct aaattcggtg cagcactgg    5640 tggacttctc tccaaagcca accgggaaga aaagtatgcc atcacctgga ccagcgcctc    5700
tgaacaagtt tttgaaaatgc ccactggcgg cgcggccatc atgaacgaag gggaaaatct    5760
cctttatcta gcccgcaaag aacagtgttt agccctgggg acccagctac ggacaaaatt    5820
taaacccaaa attcaagact acaaaattta ccgtgtttat cccagtggtg aagttcaata    5880
cctccacccc gccgatggcg ttttccctga agctaaaatt cgttttgcta ccgtttggct    5940
cgctggttgt tccggctgtc atatgtcctt ccttgatatg gacgaatggc tcattgatct    6000
cgctcaaaaa gttgatgtgg ttttcagtcc cgttggttct gatctcaagg aatacccgga    6060
caatgtggat gtttgcctag tggaagggc gatcgccaac gaagaaaatt tagagttagc    6120
tttggagttg agacagaaaa cgaaggtagt aatttccttt ggggactgtg ctgtaaccgc    6180
caatgtcccc ggtatgcgta atatgctcaa aggtagcgat ccggttctgc gccgagccta    6240
tattgaactg ggagatggga cgcctcaact gcccgatgaa cctggtattg tgccgcctct    6300
attagacaag gttattcccc tacatgaggt tattccggtg gatatttta tgcccggttg    6360 tcctcccgat gcccaccgta ttcgagcaac gctagaacca ttattaaatg gggaacatcc    6420
cctcatggaa gggcgagcaa tgatcaaatt tggttaaaat tcaagttttc taaacagttt    6480
gcaaaatagc tattcaggag atttaataat gaatacccaa ttagtagaat ccttggttca    6540
aataattcaa agtctttccc cagaggagca aaagttattg gaaactcatt tggcagaaaa    6600
aaatagcaac tggcaggagg tttgggaa aattgaaacc aatcgccaag aaatttatgc    6660
ttctcgtcag ggaaaacctt tgatctttc tatagatgaa atcatcgaag aaatgcgtga    6720
ggaaagaacc caagatgttc tacaagcctg ttttggaaaa tgattttag gtatgaccaa    6780
```

```
ccaaacttct ttcacaattt gtattgactc aaatttatt gtccgacttc ttgttgggta    6840
ttatgaagaa actatctatc ttgagatgtg aataaatgg tgtaacgcaa atactaaaat    6900
tgttgctcct gatctaatca actatgaggt gactaatgtt ttgtggcgtt taaacaagac   6960
caatcagatt aactcactc aagcccaaat tgctcttaca gaaagtttta atctcggcat    7020
tgaactttat tcaaactcag aactacacca ggatgctttg gcgatcgccg aaaagtttca   7080
attgtcagcc gcctatgatg tccattattt agctttagca gaaaaaatgc agatagattt   7140
ttatacctgt gacaaaaaac tgttcaattc cgtacaacaa atttccccta gaataaaatt   7200
agttattgct aacagtagtt agattgattt aaattcctga atatttatta caagatccgg   7260 cttctatat ttactgctca aaaaatatct aaatcaacaa taatcaatcc catgtctaaa    7320
accattgtta tcgatcccgt tacccggatt gaaggccatg ccaaaatctc cattttcctc   7380
aacgaccagg gcaacgtaga tgatgttcgt ttccatgtgg tggagtatcg gggttttgaa   7440
aaattttgcg aaggtcgtcc catgtgggaa atggctggta ttaccgcccg tatttgcggc   7500
atttgtccgg ttagccatct gctctgtgcg gctaaaaccg gggataagtt actggcggtg   7560
caaatccctc cagccgggga aaactgcgc cgtttaatga atttagggca aattacccaa   7620
tcccacgccc taagttttt ccatctcagc agtcctgatt ttctgcttgg ttgggacagt    7680
gatcccgcta ctcgcaatgt gtttggttta attgctgctg accccgattt agctagggca   7740
ggtattcggt tacggcaatt tggccaaacg gtaattgaac ttttgggagc taaaaaaatc   7800
cactctgctt ggtcagtgcc cggtggagtc cgatcgccgt tgtcggaaga aggcagacaa   7860
tggattgtgg accgttacc agaagcaaaa gaaaccgttt atttagcctt aaatttgttt    7920
aaaaatatgt tggaccgctt ccaaacagaa gtggcagaat ttggcaaatt tccctcccta   7980
tttatgggct tagttgggaa aaataatgaa tgggaacatt atggcggctc cctgcggttt   8040
accgacagtg aaggcaatat tgtcgcggac aatctcagtg aagataatta cgctgatttt   8100
attggtgaat cggtggaaaa atggtcctat ttaaaatttc cctactacaa atctctgggt   8160
tatcccgatg gcatttatcg ggttggtccc cttgcccgcc ttaatgtttg tcatcacatt   8220
ggcaccccgg aagcagacca agaattagaa gaatatcggc aacgggctgg aggtgtggcc   8280
acgtcctctt tcttttatca ttacgcccgc ttggtggaaa ttcttgcctg tttagaagcc   8340
atcgaattgt taatgctga ccctgatatt ttgtccaaaa attgtcgagc taaggcagaa    8400
attaattgta ccgaagcggt gggagtgagc gaagcacccc ggggtacttt attccaccat   8460
tacaagatag atgaagatgg tctaattaag aaagtgaatt tgatcattgc cacgggcaac   8520
aataacttag ccatgaataa aaccgtggcc caaattgcca acactacat tcgcaatcat    8580 gatgtgcaag aagggttttt aaaccgggtg gaagcgggta ttcgttgtta tgatccctgc   8640
cttagttgtt ctacccatgc agcgggacaa atgccattga tgatcgattt agttaaccct   8700 caggggaac taattaagtc catccagcgg gattaaacaa aaacattca gacggtcgac     8760 gaaaaagaa attagataaa tctctcatat ctttttattca ataatcgcat ccgattgcag   8820
tataaattta acgatcactc atcatgttca tatttatcag agctcgtgct ataattatac   8880
taattttata aggaggaaaa aatatggca ttttagtat ttttgtaatc agcacagttc     8940
attatcaacc aaacaaaaaa taagtggtta taatgaatcg ttaataagca aaattcatat   9000
aaccaaatta aagagggtta taatgaacga gaaaaatata aaacacagtc aaaactttat   9060
tacttcaaaa cataatatag ataaaataat gacaaatata agattaaatg aacatgataa   9120
tatctttgaa atcggctcag gaaaaggcca ttttacccctt gaattagtaa agaggtgtaa   9180
```

```
tttcgtaact gccattgaaa tagaccataa attatgcaaa actacagaaa ataaacttgt   9240
tgatcacgat aatttccaag ttttaaacaa ggatatattg cagtttaaat ttcctaaaaa   9300
ccaatcctat aaaatatatg gtaatatacc ttataacata agtacggata taatacgcaa   9360
aattgttttt gatagtatag ctaatgagat ttatttaatc gtggaatacg ggtttgctaa   9420
aagattatta aatacaaaac gctcattggc attacttta atggcagaag ttgatatttc   9480
tatattaagt atggttccaa gagaatattt tcatcctaaa cctaaagtga atagctcact   9540
tatcagatta agtagaaaaa aatcaagaat atcacacaaa gataaacaaa agtataatta   9600
tttcgttatg aaatgggtta acaaagaata caagaaaata tttacaaaaa atcaatttaa   9660
caattcctta aaacatgcag gaattgacga tttaaacaat attagctttg aacaattctt   9720
atctcttttc aatagctata aattatttaa taagtaagtc gacttcctgg ctctacttgc   9780
ttgcggaact tgcacaattg gcagaagttt aactaacggg cgaatttgtt aaaggcacta   9840
ctgaaccttt gacagttcgc tctttcaatg ttggcaaagg ttttatgatt tcccctgggt   9900
tttctcactt cactgaactc gcccaacaag gcaattttat tccggtgtat caggaatggg   9960
tggcggattt agaaacgcca gtttctgctt ggtacaaagt ttgctctagc caaccctaca  10020
attttctcct ggagtcggtg gaaggggag agagtattgg tcgctatagt tttctcggtt  10080
ggcggttaag gtatactttc cgctgcataa ccctgcttcg gggtcattat agcgattttt  10140
tcggtatatc catcctttt cgcacgatat acaggatttt gccaaagggt tcgtgtagac  10200
tttccttggt gtatccaacg gcgtcagccg ggcaggatag gtgaagtagg cccacccgcg  10260
agcgggtgtt ccttcttcac tgtcccttat tcgcacctgg cggtgctcaa cgggaatcct  10320
gctctgcgag gctggccgat aagctccacg tgaataactg atataattaa attgaagctc  10380
taatttgtga gttagtata catgcattta cttataatac agttttttag ttttgctggc  10440
cgcatcttct caaatatgct tcccagcctg cttttctgta acgttcaccc tctaccttag  10500
catcccttcc cttttgcaaat agtcctcttc caacaataat aatgtcagat cctgtagaga  10560
ccacatcatc cacggttcta tactgttgac ccaatgcgtc tcccttgtca tctaaaccca  10620
caccgggtgt cataatcaac caatcgtaac cttcatctct tccacccatg tctctttgag  10680
caataaagcc gataacaaaa tctttgtcgc tcttcgcaat gtcaacagta cccttagtat  10740
attctccagt agatagggag cccttgcatg acaattctgc taacatcaaa aggcctctag  10800
gttcctttgt tacttcttct gccgcctgct tcaaaccgct aacaatacct gggcccacca  10860
caccgtgtgc attcgtaatg tctgcccatt ctgctattct gtatacaccc gcagagtact  10920
gcaatttgac tgtattacca atgtcagcaa attttctgtc ttcgaagagt aaaaaattgt  10980
acttggcgga taatgccttt agcggcttaa ctgtgccctc catggaaaaa tcagtcaaga  11040
tatccacatg tgtttttagt aaacaaattt tgggacctaa tgcttcaact aactccagta  11100
attccttggt ggtacgaaca tccaatgaag cacacaagtt tgtttgcttt tcgtgcatga  11160
tattaaatag cttggcagca acaggactag gatgagtagc agcacgttcc ttatatgtag  11220
ctttcgacat                                                          11230
```

GENETICALLY MODIFIED PHOTOTROPHIC CELL FOR IN-VIVO PRODUCTION OF HYDROGEN

The invention relates to a genetically modified phototrophic cell for the in-vivo production of hydrogen.

Hydrogen ($H_2$) is an environmentally friendly energy carrier which can be brought together with oxygen ($O_2$) in fuel cells. In them, an electrolytic gas reaction occurs under controlled conditions in which pure water ($H_2O$) is formed from $H_2$ and $O_2$ and energy is released which can be harnessed, for example by being converted into electric current.

The production of $H_2$ is problematic. It is currently based on the combustion of fossil fuels and is therefore not $CO_2$-neutral. However, it is known that during photosynthesis, photoautotrophic organisms can form hydrogen. Therefore, experiments have already been carried out on the use of photoautotrophic organisms for solar energy-powered hydrogen production. No $CO_2$ is formed in this process.

Cyanobacteria and green algae, for example, use solar energy and produce hydrogen ($H_2$) by means of photosynthesis and an enzyme called hydrogenase. This formation of hydrogen, what is known as photobiological hydrogen formation (photo-$H_2$ formation), is sustained for only a few seconds to minutes and the cells then re-consume the photo-$H_2$ that is produced. It is assumed that the free-moving hydrogenase interacts with the photosystem I (PSI), accepts electrons from photosynthesis from there and uses it for photo-$H_2$ formation. However, the bidirectionally-operating hydrogenase subsequently takes up the photo-$H_2$ again and recycles the electrons elsewhere in the photosynthetic electron transport chain.

In-vitro systems for photo-$H_2$ formation by means of hydrogenase and photosystem I have already been successfully tested. Ihara et al. (2006) describe an in-vitro system, in which a membrane-bound NiFe hydrogenase from *Ralstonia eutropha* fuses to the C-terminus of the PsaE component of PSI from the cyanobacterium *Thermosynechococcus elongatus* and the fusion product associated with PsaE-deficient PSI (Ihara, M., Nishihara, H., Yoon, K.-S., Lenz, O., Friedrich, B., Nakamoto, H., Kojima, K., Honma, D., Kamachi, T., Okura, I. (2006), Light-driven Hydrogen Production by a Hybrid Complex of a [NiFe] Hydrogenase and the Cyanobacterial Photosystem I. Photochemistry and Photobiology 82:676-682). Krassen et al. (2009) describe a similar system for coupling photosynthesis and hydrogen formation, wherein a PSI from *Synechosystis* sp. without a PsaE component was assembled with a fusion protein produced from PsaE component and a subunit of an oxygen-tolerant membrane-bound hydrogenase (MBH) from *Ralstonia eutropha* on a gold substrate (Krassen, H., Schwarze, A., Friedrich, B., Ataka, K., Lenz, O., Heberle, J. (2009), Photosynthetic Hydrogen Production by a Hybrid Complex of photosystem I and [NiFe]hydrogenase, ACS Nano 3:4055-4061). Lubner et al. (2011, 2010a, 2010b) describe a nanoconstruct in which the [4Fe-4S] cluster $F_B$ in PsaC of the PSI from *Synechococcus* sp. is bonded to a [4Fe-4S] cluster of a hydrogenase from *Clostridium acetobutylicum* via a covalently bonded "molecular wire" from an organic compound which may contain 3-10 methylene groups or one or two phenyl groups (Lubner, C. E., Applegate, A. M., Knorzer, P., Ganago, A., Bryant, D. A., Happe, T., and Golbeck, J. H. (2011). Solar hydrogen-producing bionanodevice outperforms natural photosynthesis. Proceedings of the National Academy of Sciences of the United States of America 108:20988-20991; Lubner C. E., Grimme R., Bryant D. A., & Golbeck J. H. (2010a) Wiring photosystem I for Direct Solar Hydrogen Production. Biochemistry 49(3):404-414; Lubner, C. E., Knorzer, P., Silva, P. J. N., Vincent, K. A., Happe, T., Bryant, D. A., and Golbeck, J. H. (2010b). Wiring an [FeFe] hydrogenase with photosystem I for Light-Induced Hydrogen Production. Biochemistry 49:10264-10266).

A distinct disadvantage with these in-vitro systems is that they are artificial, they are difficult to synthesize and they are often short-lived.

U.S. Pat. No. 6,410,258 B1 describes a method for the production of molecular hydrogen by means of biological components, in which a hydrogenase and a photosystem I complex are used, and in which the use of an exogenous electron donor can be dispensed with. Fusion constructs are not described therein.

The objective of the present invention is to enable the long-lasting and sustainable production of hydrogen on the basis of a biological system.

In a first aspect, the invention achieves the objective by providing a phototrophic cell, which in the wild type has a native photosystem I, PSI, with PSI components and a native hydrogenase, wherein the phototrophic cell has been genetically modified to the extent that a) at least one of the native photosystem I components has been deleted, b) the native hydrogenase has been deleted, and c) at least one fusion protein is expressed which comprises i. a hydrogenase or hydrogenase component and ii. at least one PSI component, with the proviso that the PSI is complemented by expression of the at least one fusion protein and the hydrogenase component exhibits hydrogenase activity alone or together with at least one further hydrogenase component which has been expressibly introduced into the cell.

With the present invention, with the aid of a biological system which can function over the long term, it is possible to produce molecular hydrogen ($H_2$) with light as the energy source. The genetically modified phototrophic cell in accordance with the invention uses energized electrons for the production of hydrogen in photosynthesis, wherein the cells have been genetically modified in a manner such that electrons from the photosynthesis are preferably not completely withdrawn for the production of hydrogen, but continue to serve for the provision of reduction equivalents for maintaining normal cellular metabolism and preferably also $CO_2$ fixation. Thus, the invention provides the possibility for light-driven hydrogen production by means of a phototrophic cell which is still viable and preferably also capable of division.

The term "phototrophic cell" should be understood to mean a cell that can use electromagnetic radiation (light) as an energy source and convert this energy into biochemically bound energy, i.e. energy-rich chemical compounds (for example adenosine triphosphate, ATP). A phototrophic cell may be autotrophic or heterotrophic with respect to the source of carbon, i.e. use $CO_2$ or organic carbon compounds as the source of C. This includes that the phototrophic cell may also be mixotrophic, i.e. both fixes $CO_2$ by photosynthesis and also uses organic compounds as the source of C. With respect to the hydrogen or electron donor, the phototrophic cell may be lithotrophic or organotrophic, i.e. use water or organic carbon compounds.

Unless clearly indicated otherwise by the context, the term "photoautotrophic cell" should be understood to mean a cell which is capable of using $CO_2$ as the single C-source for the organic carbon compounds required by it, light by means of photosynthesis as the energy source and water as the electron donor. In this regard, the terms "photoautotrophic" and "photolithoautrotrophic" are used synonymously here. This does not exclude that the cell could also use organic compounds as the source of C or electron donor.

The term "heterotrophic" may be used here is a shorthand way of referring to organisms, for example bacteria, which use organic compounds as the source of C, the energy source and as the electron donor. In this regard, the term is used synonymously with the term "chemoorganoheterotrophic."

The term "photosystem I", also abbreviated to "PSI", designates a protein complex of membrane proteins, which catalyses the oxidation of plastocyanin and the reduction of ferredoxin by means of the absorption of photons. The photosystem I comprises a heterodimer produced from the subunits PsaA and PsaB as well as further subunits. The heterodimer of PsaA and PsaB binds the 4Fe4S cluster $F_X$. The other 4Fe4Ss clusters $F_A$, $F_B$ are bounded by the subunit PsaC, wherein $F_A$ is located in the interior of the PsaC subunit, while $F_B$ lies on the periphery and transfers electrons to ferredoxin.

The term "PSI component" as used here refers to a subunit of the photosystem I or a functional portion of a PSI subunit. In this context, "functional" means that the portion of the PSI subunit together with the remaining PSI components forms a photosystem I which is capable of functioning in-vivo, i.e. within the photosystem I it can essentially carry out the function of a complete PSI subunit. In this regard, occasionally the formulation that the PSI component is a "functional part as a component of the PSI" may be used. The functional portion of a PSI subunit may, for example, be a N-terminally or C-terminally truncated PSI subunit, i.e. a PSI subunit which has been C-terminally and/or N-terminally truncated by one or more amino acids with respect to the wild type. Examples of PSI components are the subunits PsaB, PsaC, PsaD and PsaE, or N-terminally or C-terminally truncated variants thereof.

The term "hydrogenase" refers to an oxidoreductase which catalyses the reversible transfer of electrons between $H_2$ and $H^+$ and therefore can form or activate molecular hydrogen. The synonymous term "$H_2$ase" is also occasionally used herein. In particular, the term refers to an oxidoreductase with NAD(H), NADP(H) or ferredoxin$_{ox(red)}$ as the electron acceptor/donor (EC 1.12.1). An example in this regard is a bidirectional NiFe hydrogenase (EC 1.12.1.2). A bidirectional NiFe hydrogenase encoded by the Hox operon (HoxEFUYH) will occasionally be referred to here by the synonym "Hox hydrogenase".

The term "hydrogenase component" refers to a subunit of a hydrogenase which either has its own hydrogenase activity or has hydrogen activity together with one or more other hydrogenase components. The term also encompasses a portion of a hydrogenase subunit which either has its own hydrogenase activity or has hydrogenase activity together with at least one other component. An example of a hydrogenase component which has no hydrogenase activity of its own, but which does have hydrogenase activity together with other hydrogenase components is a subunit of the diaphorase portion of a Hox hydrogenase, for example HoxU. The wording whereby a hydrogenase component "has hydrogenase activity together with at least one other hydrogenase component expressibly introduced into the cell" means that, under conditions which occur naturally in the cell, the hydrogenase component exhibits hydrogenase activity with the at least one other hydrogenase component which has been introduced into the cell in a manner such that it is expressed, spontaneously combine into a protein complex which exhibits hydrogenase activity. This does not mean that the hydrogenase component itself catalyses the corresponding electron transfer reactions in the complex, but only that the hydrogenase component is a part of the complex which catalyses the reactions.

The term "native" refers to an element which is also naturally present in this form in the respective cell, for example a gene, operon, enzyme or protein, in contrast to a foreign element, i.e. one which is not naturally present in the cell, for example a protein from a foreign organism. Occasionally, the term "homologous" will be used as a synonym for "native" and the term "heterologous" will be used here as a synonym for "foreign" or "originating from a foreign organism". The term "foreign" means that the element does not naturally occur in this form in the target cell and, for example, originates from a cell or an organism with a different genetic configuration, for example an organism from another species.

The term "expression" as used here should be understood to mean the conversion of genetic information into a product, for example, the formation of a protein or a nucleic acid using the genetic information. In particular, the term comprises the biosynthesis of proteins with the aid of the genetic information, occasionally including preceding processes such as transcription, i.e. the formation of mRNA on the basis of a DNA template. The expression wherein a protein, for example a fusion protein or a hydrogenase, is "expressed" means that the fusion protein is formed in the cell by means of the cell mechanisms which serve for the formation of proteins on the basis of a nucleic acid which codes for it, for example in that a nucleic acid which codes for the fusion protein is translated in the cell with the formation of the fusion protein. "Expressibly introduced" as used in this context having regard to a protein means that a nucleic acid which codes for the protein is introduced or has been introduced into the cell. The term "expression" as used here also encompasses an expression which is increased compared with the wild type, i.e. an over-expression compared with the wild type.

The term "fusion protein" refers to an artificial hybrid protein which is put together from different proteins or parts of different proteins. As an example, a fusion protein may be formed in the cell by translation of a nucleic acid with the coding sequences for the various proteins in the cell. The person skilled in the art will be familiar with the production of fusion proteins as well as with the means, for example expression vectors, which are used for it. The various proteins or protein portions combined into the fusion protein may be coupled together directly, or they may be connected together via a peptide linker having a larger or smaller number of amino acids. The wording "a hydrogenase or hydrogenase component is fused with a photosystem I component or a portion thereof" does not only include the case in which the hydrogenase or hydrogen component is fused with the PSI component or a portion thereof C-terminally or N-terminally, but also the case in which the hydrogenase or hydrogen component is inserted into the PSI component or a portion thereof.

The term "photo-$H_2$" refers to molecular hydrogen which is formed during photosynthesis. For the formation of photo-$H_2$, the term "photobiological hydrogen formation" is also used herein.

The term "stromal side" means towards the stroma. In cyanobacteria, the cytoplasm is described as the stroma; in eukaryotes, this is the inner matrix of the plastids.

The term "complement" as used here means that a system consisting of a plurality of components, for example the photosystem I, is supplemented by a component which was previously not present or had been removed. As an example, a photosystem I in which the subunit PsaC has been removed (deleted), is "complemented" by adding a fusion protein which comprises the PsaC or a functional portion thereof. In this regard, the previously removed native component is then reintroduced into the system in an identical or modified but functional form, for example in the form of a fusion protein with an additional hydrogenase domain, whereupon the system has been complemented. The expression "the PSI is complemented by expression of the at least one fusion protein" therefore means that with the formation of the at least one fusion protein the photosystem I is supplemented by that component or a functional portion thereof which had previously been deleted. If PsaC had been deleted, the PSI is complemented if a fusion protein is expressed which comprises the PsaC or a functional portion of PsaC which can substantially take over the function of the native PsaC within the PSI. If PsaC and PsaD have been deleted, the PSI is complemented if, for example, a common fusion protein is expressed which comprises both PsaC as well as PsaD or a functional portion thereof or, for example, two individual fusion proteins are expressed, one of which comprises a PsaC and the other PsaD or a functional portion thereof.

The term "deleted" means that an encoding sequence, for example a gene which codes for a protein, has been completely deleted or deactivated, so that the corresponding gene product is essentially not formed or is not formed in a functional form.

The term "biofilm" describes a living community of microorganisms, for example bacteria, in a film-like common matrix produced from polymeric extracellular material, for example exopolysaccharides and/or proteins. It may be a community of microorganisms of the same species or of different species. As an example, autotrophic cyanobacteria may cohabit with heterotrophic bacteria in a biofilm.

The term "anaerobic" as used here means the exclusion of oxygen, or at least severely oxygen-limited conditions.

The term "nucleic acid" should be understood to mean a polymer the monomers of which are nucleotides. A nucleotide is a compound formed by a sugar residue, a nitrogen-containing heterocyclic organic base (nucleotide or nucleobase) and a phosphate group. The sugar residue is usually a pentose; in the case of DNA it is deoxyribose, and in the case of RNA it is ribose. The nucleotides are bonded together via the phosphate group by means of a phosphodiester bridge, usually between the 3' C-atom of the sugar component of a nucleoside (compound of nucleobase and sugar) and the 5' C-atom of the sugar component of the adjacent nucleoside. The term "nucleic acid" encompasses, for example, DNA, RNA and mixed DNA/RNA sequences. As used here, the term "nucleic acid" in particular refers to an isolated nucleic acid. The term "isolated nucleic acid" as used here should be understood to mean a nucleic acid which has been removed from its natural or original environment or a synthetically produced nucleic acid.

The term "vector" as used here should be understood to mean a transport vehicle for the transfer of a (usually foreign) nucleic acid into a living receiver cell by transfection or transduction. As an example, a gene can be introduced into a cell with the aid of a vector. Vectors are well known to the person skilled in the art. Examples of vectors are plasmids, viral vectors or mRNA.

The term "comprising" is used here in this form to define both a subject-matter which exclusively has the features specified in the term as well as a subject-matter which has other features as well as the features specified in the term. The definition of a subject-matter as "comprising" specific features therefore also encompasses the definition of that subject-matter by the conclusive listing of these features, i.e. by the presence of exclusively those features.

The term "segregation" as used here means a process for selecting genetically modified (mutated) cells which exclusively have genome copies with the mutation. As an example, the process is used in the case of polyploid prokaryotic organisms, for example Synechocystis sp., the genome of which is present in more than just one copy in the cell. In the production of mutants of such cells, a genetically modification is usually not necessarily present in all genome copies, so that cells result which, in addition to one or more genetically modified genome copies, also contain one or more genome copies of the (unmodified) wild type. In order to obtain cells where all of the genome copies in the cell are present in the appropriate genetically modified form, these are selected, for example by means of a suitable marker, for example antibiotic resistance. As an example, "segregation" in the case of Synechocystis can be carried out by multiple inoculation of the cells onto antibiotic-containing agar plates, wherein in the ideal case, all of the wild type gene copies are lost and are then segregated if all of the genome copies contain the mutated gene.

The invention provides a living genetically modified phototrophic cell, for example cyanobacterial cell, which is capable of forming photo-$H_2$ efficiently and for as long as possible. This is made possible by means of fusion constructs produced from at least one PSI component and a hydrogenase or hydrogenase component, whereupon as efficient as possible and preferential transfer of electrons from the photosynthesis to cellular hydrogenase occurs and not, for example, to ferredoxin. The phototrophic cell in accordance with the invention in this regard, compared to a genetically modified cell which is not in accordance with the invention or compared to a wild type cell, preferably has higher photobiological hydrogen formation. Water ($H_2O$) can advantageously function as an electron donor in this regard. However, organic compounds may also be used as electron donors.

The genetically modified phototrophic cell expresses a fusion protein from a photosystem-I component, for example PsaB, PsaC, PsaD or PsaE, or from a functional portion of PsaB, PsaC, PsaD or PsaE within a PSI, and of a hydrogenase or hydrogenase component. The hydrogenase itself has hydrogenase activity. In the case of a hydrogenase component, this may either itself have hydrogenase activity or combine with at least one further hydrogenase component in the cell together with which it exhibits the hydrogenase component activity. The further hydrogenase component is preferably introduced into the cell together with the fusion protein, advantageously with the aid of the same nucleic acid construct, so that the hydrogenase component fused to the PSI component in the cell forms a protein complex which has hydrogenase activity in the cell together with the at least one further hydrogenase component. In the cell in accordance with the invention, a native hydrogenase which is present in the wild type, which can use electrons from the PSI in order to form hydrogen, has preferably been deleted. In a native hydrogenase which is composed of several hydrogenase components, e.g. a Hox hydrogenase, preferably, the genes for all of the components have been deleted. The PSI component which is expressed as a component of the fusion protein in the cell, has previously been deleted in its native form so that the respective PSI component in the cell in accordance with the invention is essentially no longer expressed without the hydrogenase or hydrogenase component fused with it. Thus, a cell in accordance with the invention is genetically modified in a manner such that a PSI component which has previously been deleted is expressed as part of the fusion protein in the cell, so that the expression of the fusion protein leads to complementation of the photosystem I. This results in a functional photosystem I in the cell in accordance with the invention, wherein, however, a hydrogenase or hydrogenase component is fused with a PSI component. The wording according to which "a photosystem I component which has previously been deleted is expressed as part of the fusion protein" encompasses the case in which not the complete PSI subunit but only a functional portion of the PSI subunit, for example a C-terminally or N-terminally truncated PSI subunit, has been introduced into the cell with the fusion protein which had previously been deleted in its native form. A functional portion of the (deleted) PSI subunit is therefore capable of at least substantially taking over the function of the deleted native PSI subunit within the PSI.

The phototrophic cell in accordance with the invention produces photo-$H_2$ via the fusion construct, but is still viable and preferably also capable of division. Preferably, the phototrophic cell is capable of growing autotrophically or even also heterotrophically or mixotrophically. Particularly preferably, the phototrophic cell in accordance with the invention is capable of growing photolithoautotrophically. In order to maintain the viability, the invention employs a fusion construct in which a hydrogenase or hydrogenase component is fused with a component of the photosystem I in a manner such that not all of the electrons from the photosynthesis are dissipated for photo-$H_2$ formation, but a portion thereof can be used further by the cell for maintaining cellular metabolism and maintaining or building cell substance. Although the growth of the genetically modified cell in accordance with the invention is regularly reduced compared with the wild type, it is nevertheless present. Because the cells synthesize the fusion construct themselves, it is also not necessary to carry out extensive synthesis of them. Moreover, the in-vivo system in accordance with the invention of a hydrogenase or hydrogenase component fused with the PSI is more long-lived than in-vitro systems because of cell repair and regeneration processes.

The hydrogenase or hydrogenase component or the PSI component, for example PsaC, PsaB, PsaD or PsaE, or a functional portion thereof, in the fusion protein may be homologous with or heterologous to the respective components of the phototrophic cell. Preferably, however, homologous components are used. In the case in which the phototrophic cell is a *Synechocystis* cell, for example, the components contained in the fusion protein are preferably also from *Synechocystis* sp., or at least from a cyanobacterial cell. However, it is also possible to use suitable heterologous components or both homologous as well as heterologous components.

In the fusion protein, the hydrogenase or hydrogenase component and the PSI component may be linked directly together or linked via a peptide linker, wherein the peptide linker merely acts as a spacer and does not have any enzyme transport or electron transport function.

In the phototrophic cell in accordance with the invention, the hydrogenase or hydrogenase component in the fusion protein is preferably inserted into a PSI component or disposed behind or in front of the PSI component in the N-C direction. Both in case of an insertion and in the case of N-terminal or C-terminal fusion of the hydrogenase or hydrogenase component, a peptide linker may be provided as a spacer between PSI component and hydrogenase or hydrogenase component. The hydrogenase or hydrogenase component may therefore follow the PSI component in the case of C-terminal disposition of the hydrogenase or hydrogenase component behind the PSI component in the N-C direction immediately C-terminally or separated via a peptide linker. In the case of an N-terminal disposition of the hydrogenase or hydrogenase component, the hydrogenase or hydrogenase component may be in front of the PSI component immediately N-terminally or separated via a peptide linker.

The sequence of PSI component and hydrogenase or hydrogenase component within the fusion protein can therefore be N-terminus-PSI component-(linker)-hydrogenase/hydrogenase component-C-terminus or N-terminus-hydrogenase/hydrogenase component-(linker)-PSI component-C-terminus. PSI component and hydrogenase/hydrogenase component may immediately follow one another, so that the N-terminus of the hydrogenase/hydrogenase component immediately follows the C-terminus of the PSI component or the N-terminus of the PSI component immediately follows the C-terminus of the hydrogenase/hydrogenase component. However, PSI component and hydrogenase/hydrogenase component may also follow each other separated via a peptide linker, i.e. a section of one or more successive amino acids. In this regard, the linker acts only as a spacer and has no enzymatic or electron transport function. However, it is also possible to insert the hydrogenase or hydrogenase component into a PSI component, for example into a loop of a PSI component which in-vivo preferably lies on the side facing the stroma. The hydrogenase/hydrogenase component can therefore be introduced into a region within the PSI component in a manner such that the PSI component is still able to carry out its function within the photosystem I, but also has an introduced hydrogenase component which preferably is accessible on its surface, so that here, electrons can be transported out of the PSI. As an example, a hydrogenase or hydrogenase component may be fused into a loop of PsaB. The fusion protein may therefore also have the structure N-terminus-PSI component-x1-hydrogenase/hydrogenase component-PSI component-x2-C-terminus, wherein x1 and x2 represent both portions of the PSI component, x1 representing the N-terminal end, x2 representing the C-terminal end. The PSI component may be a C-terminal and/or N-terminally truncated PSI subunit. As an example, the PSI subunit may be truncated within an in-vivo stromal side loop, i.e. up to an amino acid within the loop, and the hydrogenase/hydrogenase component may be fused C-terminally or N-terminally to the truncated PSI subunit, i.e. to the remaining N-terminal or C-terminal portion of the PSI subunit. Here again, in each case there is the possibility that the hydrogenase/hydrogenase component is fused with the PSI component via a linker (or in fact two linkers in the case of insertion within a PSI component).

The fusion protein preferably consists of only PSI component and hydrogenase/hydrogenase component, which may optionally be linked together via a linker.

In the phototrophic cell in accordance with the invention, preferably, at least one of the native PSI components (subunits) PsaB, PsaC, PsaD or PsaE, preferably one of the PSI components PsaB, PsaC or PsaD, has been deleted, and the fusion protein comprises this at least one PSI component, i.e. the complete PSI subunit or a functional portion thereof, for example a C-terminal or N-terminally truncated PSI subunit. As already described above, the PSI component covalently bonded with a hydrogenase or hydrogenase component contained in the fusion protein complements the native photosystem I, i.e. supplements the native photosystem I by the PSI component which has been deleted from the genetically modified phototrophic cell of the invention and which is therefore missing. If, for example, the PsaD PSI component has been deleted from the cell, the fusion protein comprises PsaD as the PSI component, or a functional portion thereof, and a hydrogenase or hydrogenase component fused with it. This is also the case with other PSI components.

In the phototrophic cell in accordance with the invention, the PSI-H$_2$ase fusion protein is preferably constructed in a manner such that in-vivo in the PSI, there is as small a separation as possible between a metal cluster, for example a NiFe cluster or 4Fe-4S cluster, of the hydrogenase and a FeS cluster of the PSI. The FeS cluster of the PSI may be $F_X$, $F_A$ or $F_B$ wherein, depending on the fusion construct, one of the FeS clusters may be preferred, for example $F_B$ of PsaC. In the case of a bidirectional Hox hydrogenase with a NiFe cluster in HoxH and a 4Fe4S cluster in HoxY, it is advantageous, for example, for the separation between the NiFe cluster in HoxH or the 4Fe4S cluster in HoxY and $F_A$ or $F_B$, preferably $F_B$, of PsaC, to be at most 14 Å, preferably less. A suitable fusion protein was constructed for this purpose. This is based on the assumption that the efficiency of the electron transfer between metal clusters depends on the distance between the redox centres, wherein the distance should be as small as possible and preferably should not exceed 14 Å (C. C. Page, C. C. Moser, X. Chen, P. L. Dutton, Natural engineering principles of electron tunnelling in biological oxidation-reduction. Nature 402, 47-52 (1999); J. M. Hudson et al., Electron Transfer and Catalytic Control by the Iron-Sulfur Clusters in a Respiratory Enzyme, *E. coli* Fumarate Reductase. Journal of the American Chemical Society 127, 6977-6989 (2005)).

In a preferred embodiment of a phototrophic cell in accordance with the invention, the native hydrogenase is a Hox hydrogenase, and the native hydrogenase components HoxE, HoxF, HoxU, HoxY and HoxH are deleted. This is particularly preferable for the case in which the phototrophic cell is a cyanobacterial cell, for example a *Synechocystis* cell.

The phototrophic cell in this regard is preferably genetically modified in a manner such that the hydrogenase components HoxY and HoxH are expressed. Preferably, the at least one fusion protein comprises the hydrogenase component HoxY or HoxH, preferably HoxY.

Thus, a particularly preferred phototrophic cell in accordance with the invention is a cyanobacterial cell, for example a cell of the species *Synechocystis*, in which the Hox operon (HoxEFUYH) has been deleted and in which a fusion protein from a previously deleted PSI component and HoxY or HoxH, preferably HoxY, is expressed. The phototrophic cell in accordance with the invention is furthermore genetically modified in a manner such that in the case in which HoxY is fused with the PSI component, HoxH is also expressed, or in the case in which HoxH is fused with the PSI component, HoxY is also expressed. HoxH and HoxY are those components of a Hox hydrogenase which provide the hydrogenase activity. By means of additional expression of the Hox component which is respectively not fused with the PSI component in addition to the Hox component fused with the PSI component, a highly functional hydrogenase within the cell in accordance with the invention is formed which is composed of HoxH and HoxY, wherein one of the Hox components is fused with the PSI component. In this preferred embodiment of a phototrophic cell in accordance with the invention, preferably a cyanobacterial cell, then, the Hox operon HoxEFUYH has been deleted and the cell is furthermore genetically modified to the extent that HoxYH is expressed, wherein preferably, HoxY is fused with a PSI component, for example PsaB, PsaC, PsaD or PsaE, preferably PsaB, PsaC or PsaD, more preferably PsaD, or a functional portion thereof, and is expressed as part of a fusion protein from the PSI component and HoxY, while HoxH is also expressed, but not as part of the fusion protein. Preferably, the fusion protein is produced from PSI component and HoxY (or HoxH) as well as HoxH (or HoxY, if HoxH is part of the fusion protein) under the control of the same promoter, for example the promoter for the respective PSI component.

In the context of the invention, the hydrogenase component which is fused with the PSI component, when this is a Hox hydrogenase, may also be a component of the diaphorase portion of the Hox hydrogenase, i.e. HoxE, HoxF or HoxU, preferably HoxU, or a functional portion thereof. The term "functional" as used here means that the portion together with other Hox components forms a functional hydrogenase in-vivo or under physiological conditions in-vitro. In this case, the hydrogenase portion of Hox hydrogenase (HoxYH) is also expressed, preferably under the control of the promoter which controls the fusion protein produced from PSI component and HoxU. HoxYH then binds in-vivo to the fusion protein produced from PSI component and HoxU. Again with an embodiment of this type, the Hox operon is initially completely deleted, and one or more nucleic acids coding for the Hox components are then re-introduced into the cell. In all variants, it is also possible not only to reintroduce one diaphorase component of the Hox hydrogenase into the cell, but to introduce two or all diaphorase components. This is also the case for the embodiment in which the fusion protein comprises one of the components HoxH or HoxY. Thus, for example, the invention encompasses the fact that HoxEFUYH has been deleted, and HoxYH then (with HoxY or HoxH, preferably HoxY, as part of the fusion proteins) is reintroduced into the cell together with HoxUFE, HoxFE, HoxUE, HoxUF, HoxE, HoxU or HoxF, preferably under the common control of a promoter, for example the promoter for the PSI component of the fusion protein. Preferably however, HoxEFUYH has been deleted and only a portion of the Hox components are reintroduced into the cell, for example only HoxYH (and not HoxEFU as well) or only HoxUYH (and not HoxEF as well), wherein at least one of these introduced Hox components is fused with a PSI component.

In a further preferred embodiment of the invention, in the phototrophic cell:
a) the hydrogenase or hydrogenase component is fused with PsaB or a functional portion thereof in a manner such that the hydrogenase or hydrogenase component is orientated towards the stroma, and/or
b) the hydrogenase or hydrogenase component is fused with PsaC, or a functional portion thereof, in a manner such that the hydrogenase or hydrogenase component is orientated towards the stroma, and/or
c) the hydrogenase or hydrogenase component is fused with the C-terminus of PsaD, or of a functional portion thereof, for example to the C-terminus of a C-terminally truncated PsaD, in a manner such that the hydrogenase or hydrogenase component is orientated towards the stroma, and/or
d) the hydrogenase or hydrogenase component is fused with the N-terminus of PsaE, or of a functional portion thereof, for example to the N-terminus of a N-terminally truncated PsaE, in a manner such that the hydrogenase or hydrogenase component is orientated towards the stroma.

The heterodimer of PsaA and PsaB binds the 4Fe4S cluster $F_X$. In order to transfer electrons to the hydrogenase as early as possible and with particularly negative redox potential, the hydrogenase or hydrogenase component may be fused with PsaB or a functional portion thereof in a manner such that the hydrogenase or hydrogenase component is orientated towards the stroma. As an example, the hydrogenase or hydrogenase component may be fused into or onto a loop of PsaB which lies on the side facing the stroma. This makes it possible to transfer electrons directly from $F_X$ to the hydrogenase.

PsaC binds the two 4Fe4S clusters $F_A$ and $F_B$. While $F_A$ lies in the interior of the PsaC subunit, $F_B$ lies at its periphery and in the wild type transfers its electrons to ferredoxin (Ferredoxin). The hydrogenase or hydrogenase component is therefore preferably fused with PsaC, or a functional portion thereof, in a manner such that the hydrogenase or hydrogenase component is orientated towards the stroma. As an example, the hydrogenase or hydrogenase component may be fused into or onto a loop of PsaC which protrudes into the stroma and lies in the vicinity of $F_B$, so that a transfer of electrons can occur from $F_B$ to the hydrogenase.

The hydrogenase or hydrogenase component may also, for example, be suitably fused with PsaD, or a functional portion thereof, for example to the C-terminus of PsaD, or to the C-terminus of a C-terminally truncated PsaD. The C-terminus of PsaD lies in the vicinity of the Ferredoxin binding site (Grotjohann, I., Fromme, P., 2005, Structure of cyanobacterial photosystem I. Photosynthesis Research 85:51-72). By fusing the hydrogenase to the C-terminus of PsaD or a variant which has been suitably C-terminally truncated, binding of Ferredoxin can be blocked or at least made more difficult, so that electrons are preferably transferred from $F_B$ to the hydrogenase. In the case of a truncated PSI subunit, this is truncated in a manner such that it remains functional, i.e. it can still carry out its function as part of the photosystem I.

The hydrogenase or hydrogenase component may also be fused with PsaE, or a functional portion thereof, for example to the N-terminus of PsaE, or to the N-terminus of a N-terminally truncated PsaE. Here again, a truncated PsaE subunit should be truncated in a manner such that it remains functional in photosystem I.

The hydrogenase or hydrogenase component expressed in the cell with the fusion protein is preferably a component or a functional portion thereof which is identical to the corresponding deleted component. The term "functional portion thereof" means a portion which either has hydrogenase functionality or which binds in-vivo with at least one other hydrogenase component to form a functional hydrogenase. In order to fuse to a PSI component, for example PsaB, PsaC, PsaD or PsaE, suitable hydrogenases or hydrogenase components are known to the person skilled in the art or can readily be found. An oxygen-sensitive cyanobacterial hydrogenase or hydrogenase component is preferred. As an example, a bidirectional NiFe hydrogenase (EC 1.12.1.2), or a component thereof, for example a bidirectional NiFe hydrogenase (Hox hydrogenase) from a cyanobacterium, for example from *Synechocystis* sp., or a component thereof, may be used. Cyanobacterial bidirectional NiFe hydrogenases, for example from *Synechocystis* sp., are composed of five components (subunits) and are encoded by the Hox operon (HoxEFUYH). The subunits HoxY and HoxH (HoxYH) have hydrogenase functionality, while HoxE, HoxF and HoxU (HoxEFU) have diaphorase activity. A suitable hydrogenase is also the soluble NiFe hydrogenase from *Ralstonia eutropha* (*Cupriavidus necator*). Advantageously, a thermostable bidirectional $H_2$ase from a cyanobacterium, for example from *Mastigocladus laminosus* or from a thermophilic strain of the genus *Fischerella* may also be used. Hydrogenases which are preferably from thermophilic or hyperthermophilic Archaebacteria, for example the soluble NiFe hydrogenase PfSHI from *Pyrococcus furiosus*, are also suitable in the context of the invention.

The phototrophic cell in accordance with the invention is preferably a cyanobacterial cell, more preferably a cyanobacterial cell from the genus *Synechocystis*. Preferably, the hydrogenase or hydrogenase component as well as the PSI component are also present in the fusion protein from a Cyanobacterial cell, preferably from *Synechocystis* sp. The hydrogenase or hydrogenase component is preferably a bidirectional NiFe hydrogenase from *Synechocystis* sp. or a component of the NiFe hydrogenase from *Synechocystis* sp. As already described above, however, other hydrogenases, preferably soluble bidirectional NiFe hydrogenases, may also be considered.

In a further aspect, the invention also provides a nucleic acid which encodes a fusion protein in accordance with the invention of i. a hydrogenase or hydrogenase component and ii. a PSI component. In the case in which the nucleic acid codes for a hydrogenase component, the hydrogenase component has hydrogenase activity alone or together with at least one further hydrogenase component. When the hydrogenase component does not have any hydrogenase activity of its own, the nucleic acid preferably also comprises sequences which code for at least one further hydrogenase component which has hydrogenase activity together with the hydrogenase component. The at least one further hydrogenase component may, however, also be encoded by a separate nucleic acid. The nucleic acid may contain other elements, for example a suitable promoter, which ensures or supports the expression of the fusion protein in accordance with the invention in the target cell, for example a cyanobacterial cell. As an example, the nucleic acid may be part of a suitable expression vector.

The fusion protein is encoded by the nucleic acid in a manner such that a fusion protein is formed in the cell, as described in more detail above in respect of the first aspect of the invention. In addition to the sequences coding for the fusion protein, the nucleic acid may also comprise sequences which code for further components, for example Hox components, which are not components of the fusion protein. These further components may be under the control of the same promoter which also controls the expression of the fusion protein, or in fact under the control of one or more other promoters.

In a preferred embodiment of the invention, the nucleic acid comprises the promoter for the PSI component of the fusion protein, wherein the promoter is functionally linked to the gene coding for the fusion protein, so that the fusion protein is formed in the cell under the control of the promoter. However, other promoters may be employed.

In the PSI component which is a component of the fusion protein for which the nucleic acid codes, this may be one of the PSI subunits PsaB, PsaC, PsaD or PsaE, preferably one of the PSI subunits PsaB, PsaC or PsaD, or a functional portion thereof.

In a preferred embodiment, the nucleic acid in accordance with the invention:

a) the coding sequence for the hydrogenase or hydrogenase component is fused with the coding sequence for PsaB, or a functional portion thereof, in a manner such that the hydrogenase or hydrogenase component of the fusion protein expressed in-vivo after introduction of the nucleic acid into a phototrophic cell is orientated towards the stroma, and/or b) the coding sequence for the hydrogenase or hydrogenase component is fused with the coding sequence for PsaC, or a functional portion thereof, in a manner such that the hydrogenase or hydrogenase component of the fusion protein expressed in-vivo after introduction of the nucleic acid into a phototrophic cell is orientated towards the stroma, and/or c) the coding sequence for the hydrogenase or hydrogenase component is fused with the coding sequence for PsaD, or a functional portion thereof, in a manner such that the hydrogenase or hydrogenase component of the fusion protein expressed in-vivo after introduction of the nucleic acid into a phototrophic cell is fused with the C-terminus of PsaD, or of a functional portion thereof, for example to the C-terminus of a C-terminally truncated PsaD, and/or d) the coding sequence for the hydrogenase or hydrogenase component is fused with the coding sequence for PsaE, or a functional portion thereof, in a manner such that the hydrogenase or hydrogenase component of the fusion protein expressed in-vivo after introduction of the nucleic acid into a phototrophic cell is fused with the N-terminus of PsaE, or of a functional portion thereof, for example to the N-terminus of a N-terminally truncated PsaE.

In a preferred embodiment of the nucleic acid in accordance with the invention, the nucleic acid codes for a fusion protein from the Hox hydrogenase component HoxY and PsaD, or a functional portion of PsaD, wherein the coding sequence of HoxY is fused with the coding sequence of PsaD in a manner such that in the expressed fusion protein, HoxY is fused with the C-terminus of PsaD or the C-terminus of a functional portion of PsaD, preferably of a C-terminally truncated PsaD. In addition, the nucleic acid preferably additionally codes for the Hox hydrogenase component HoxH, however without this becoming part of the fusion protein.

In a further aspect, the invention also concerns a vector which comprises the nucleic acid in accordance with the invention.

In a further aspect, the present invention also concerns the use of a phototrophic cell in accordance with the invention for the production of molecular hydrogen ($H_2$).

In a yet still further aspect, the present invention concerns a method for the production of hydrogen, wherein at least one phototrophic cell in accordance with the invention is cultured in an aqueous medium and/or in a biofilm under light.

In the method in accordance with the invention, a plurality of phototrophic cells in accordance with the invention are preferably cultured under suitable conditions in a manner such that the cells can carry out photosynthesis. To this end, the cells are cultured in a suitable aqueous medium and/or a biofilm under illumination by light, for example sunlight. As an example, the cells may be cultured in a bioreactor. The cells may be cultured under autotrophic, heterotrophic or mixotrophic conditions. Preferably, the cells are autotrophic and cultured without the addition of organic carbon compounds. However, organic carbon compounds may optionally be added to the medium in order to enable heterotrophic or mixotrophic growth. The molecular hydrogen which is formed is trapped with suitable means and stored, for example.

In a preferred embodiment of the method in accordance with the invention, the phototrophic cell is cultured under anaerobic conditions, i.e. with the exclusion of oxygen, or under conditions in which the oxygen content in the environment of the cell is so low that the activity of an oxygen-sensitive hydrogenase or hydrogenase component is not compromised.

The invention will now be described in more detail purely by way of illustration with the aid of exemplary embodiments and the drawings.

FIG. 1: NAD(P)H/NAD(P)$^+$ ratios were determined at the same time as fermentative $H_2$ production by *Synechocystis* cells which were cultured on either nitrate or arginine.

Figure 2:
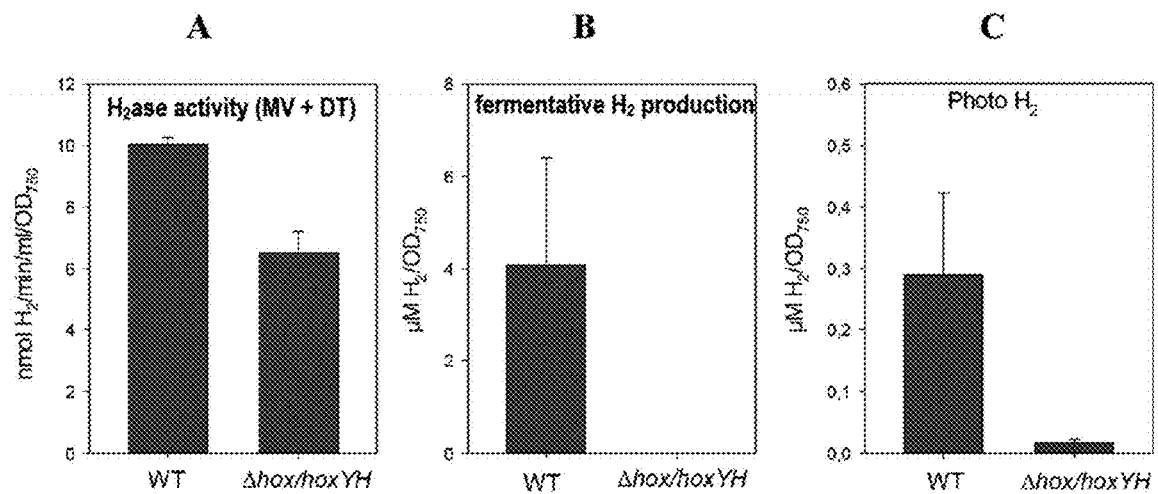

FIG. 2: Hydrogen production of wild type (WT) and Δhox/hoxYH mutants. (A) The hydrogenase assay in the presence of reduced methylviologen (MV) shows that the Δhox/hoxYH mutants express an active hydrogenase. (B) Fermentative and (C) photo-$H_2$ production from WT and Δhox/hoxYH mutants.

Figure 3:
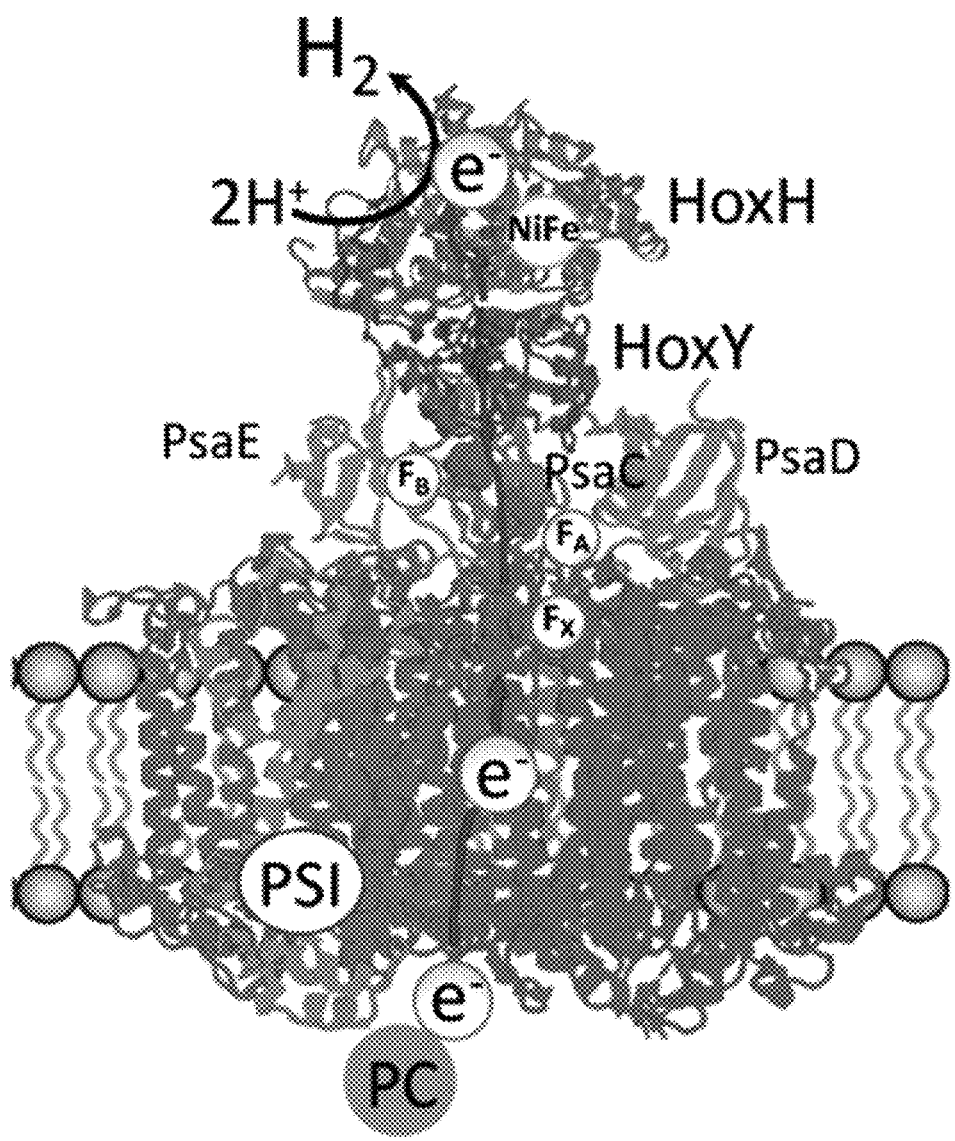

FIG. 3: The Hox-$H_2$ase (HoxYH) from *Synechocystis* was fused in-vivo to its photosystem I (PSI), in which the hydrogenase units hoxYH were fused with the PSI subunit psaD. The $H_2$ase was fused with a short section of PsaD subunit truncated C-terminally by 35 amino acids, which in its wild type version surrounds PsaC in a clamp-like manner in the immediate vicinity of the 4Fe-4S cluster $F_B$ (44), in order to facilitate electron transfer between $F_B$ and the 4Fe-4S cluster of HoxY. The assumed electron transfer from plastocyanin (PC) via the 4Fe-4S cluster $F_X$, $F_A$ and $F_B$ of PSI to HoxY and further on to the NiFe centre of HoxH is shown by arrows.

Figure 4:
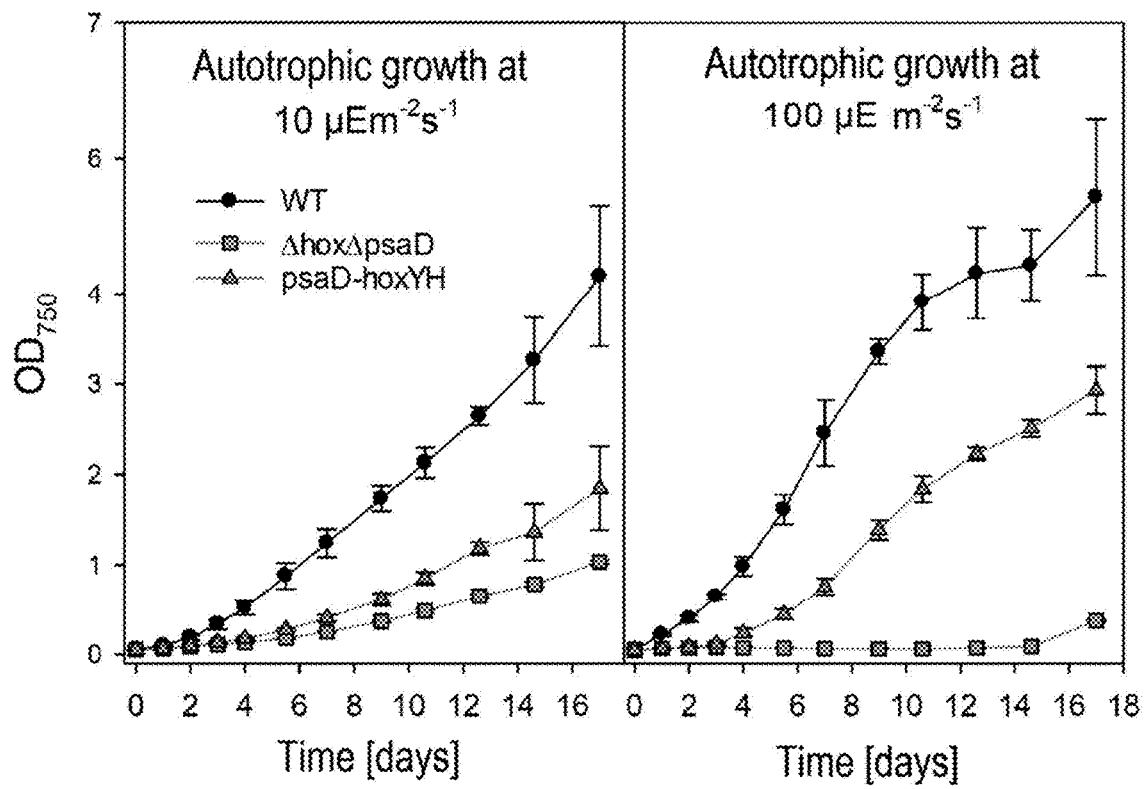

FIG. 4: Growth of wild type (WT), ΔhoxΔpsaD and psaD-hoxYH (=ΔhoxΔpsaD/psaD-hoxYH mutants) at 10 and 100 µE·m2·s$^{-1}$ under photoautotrophic conditions with constant lighting.

Figure 5:
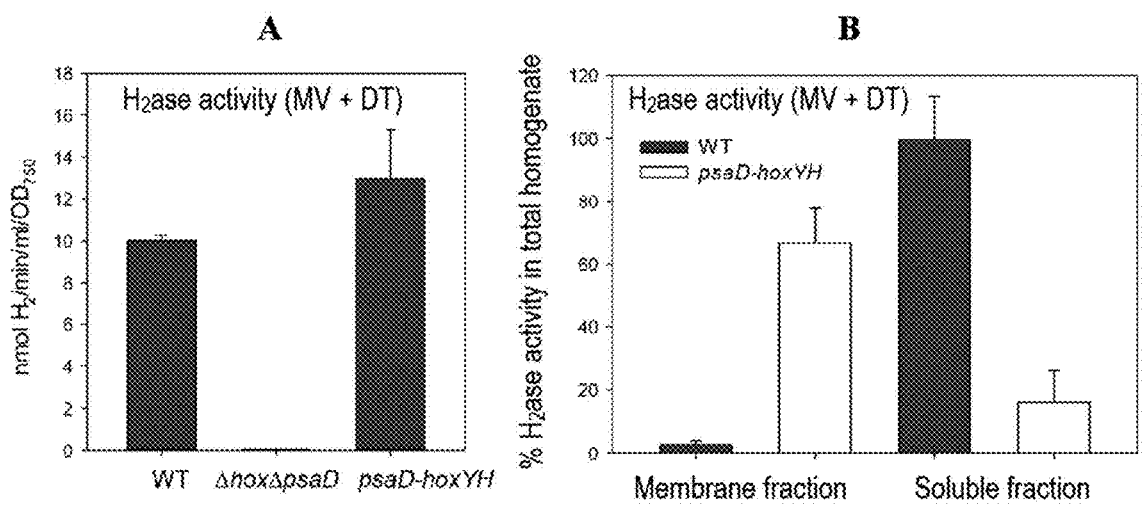

FIG. 5: Hydrogenase activity in wild type (WT) and psaD-hoxYH mutants. (A) A hydrogenase test in the presence of reduced methylviologen (MV) shows that psaD-hoxYH expresses an active hydrogenase. (B) The major portion of the $H_2$ase activity of WT cell homogenates was detected in the soluble fraction, whereas the largest portion of the $H_2$ase activity of psaD-hoxYH homogenates was in the membrane fraction as expected, confirming the successful binding of HoxYH to the thylakoid membrane via PSI. It should be noted that some activity was lost upon separation of the fractions. Thus, the values do not add up to 100%.

Figure 6:
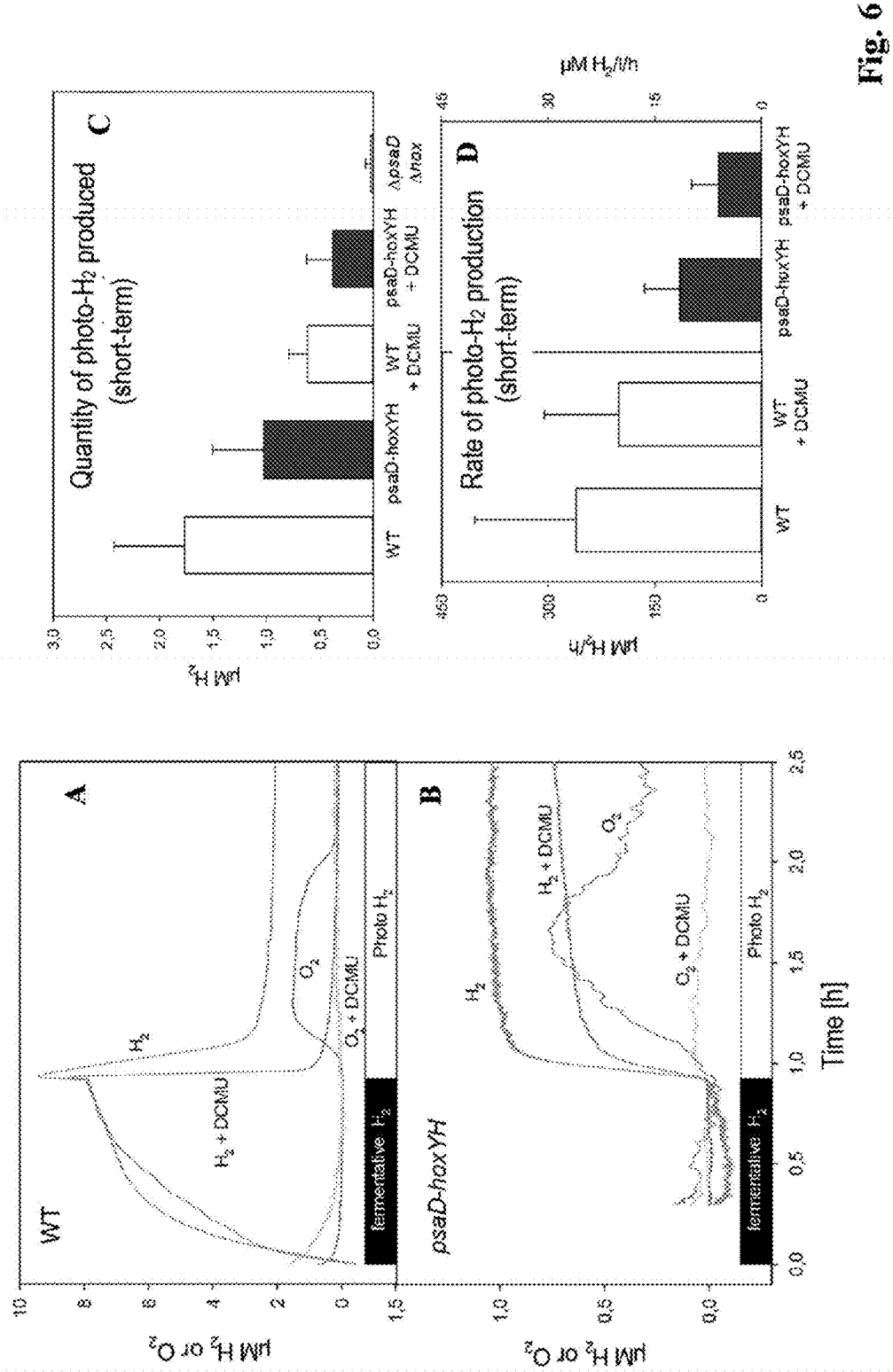

FIG. 6: Short-term in-vivo $H_2$ and $O_2$ production in wild type (WT) and psaD-hoxYH in darkness and illumination under anaerobic conditions in the absence and presence of DCMU. Anaerobic conditions were obtained by adding glucose, glucose oxidase and catalase. (A) Fermentative and photo-$H_2$ production in the WT with subsequent $H_2$ take-up. (B) Photo-$H_2$ production in psaD-hoxYH. The psaD-hoxYH is deficient in fermentative $H_2$ production and $H_2$ pickup. (C) Average amount of photo-$H_2$ production in WT and psaD-hoxYH. (D) Average rate of photo-$H_2$ production in WT and psaD-hoxYH. Note the different scales in the two figures.

Figure 7:
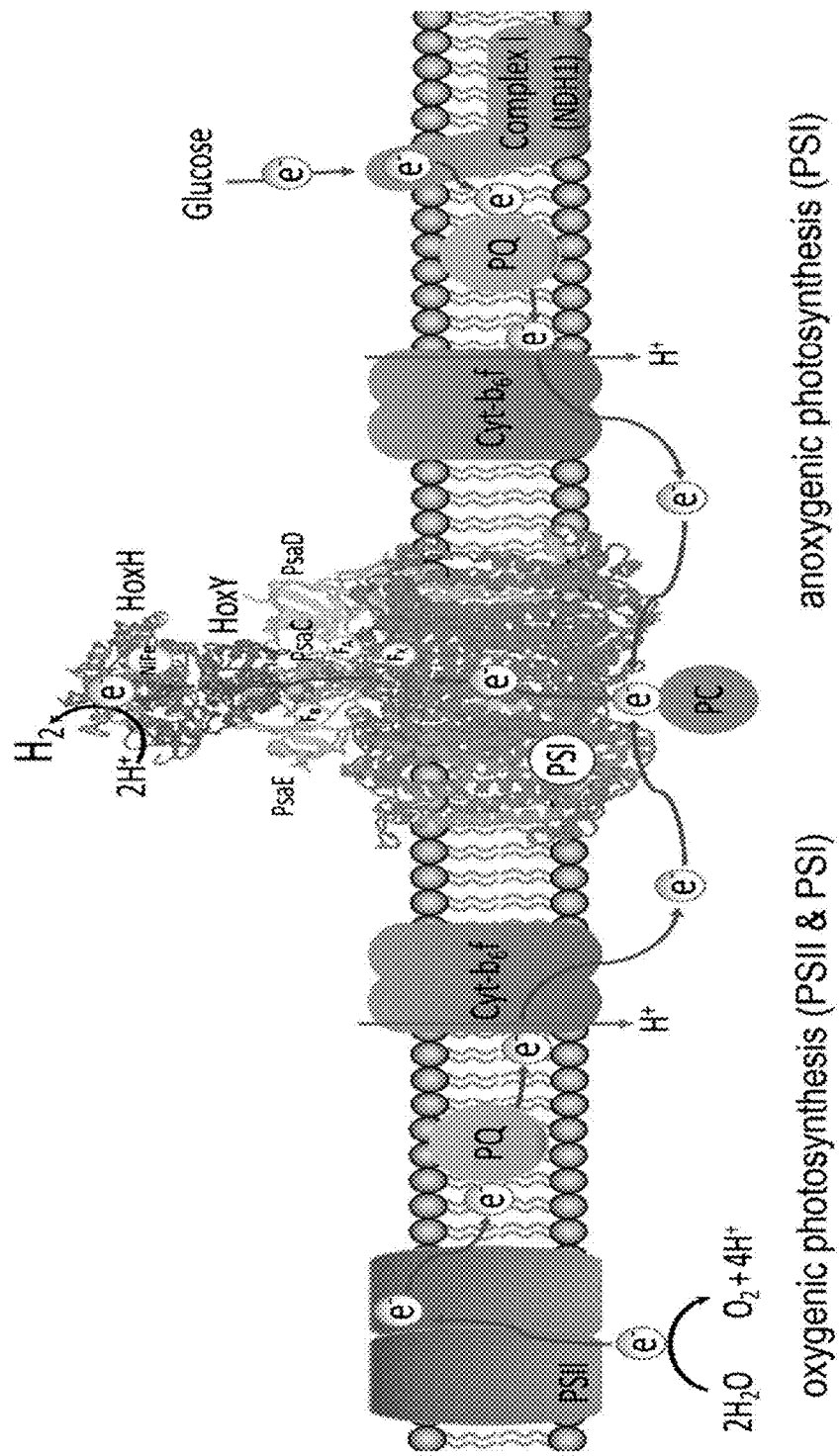

FIG. 7: In-vivo photo-$H_2$ production in WT and psaD-hoxYH based either on oxygenic photosynthesis with $H_2O$ splitting or alternatively on anoxygenic photosynthesis, for example with glucose as the electron donor.

Figure 8:
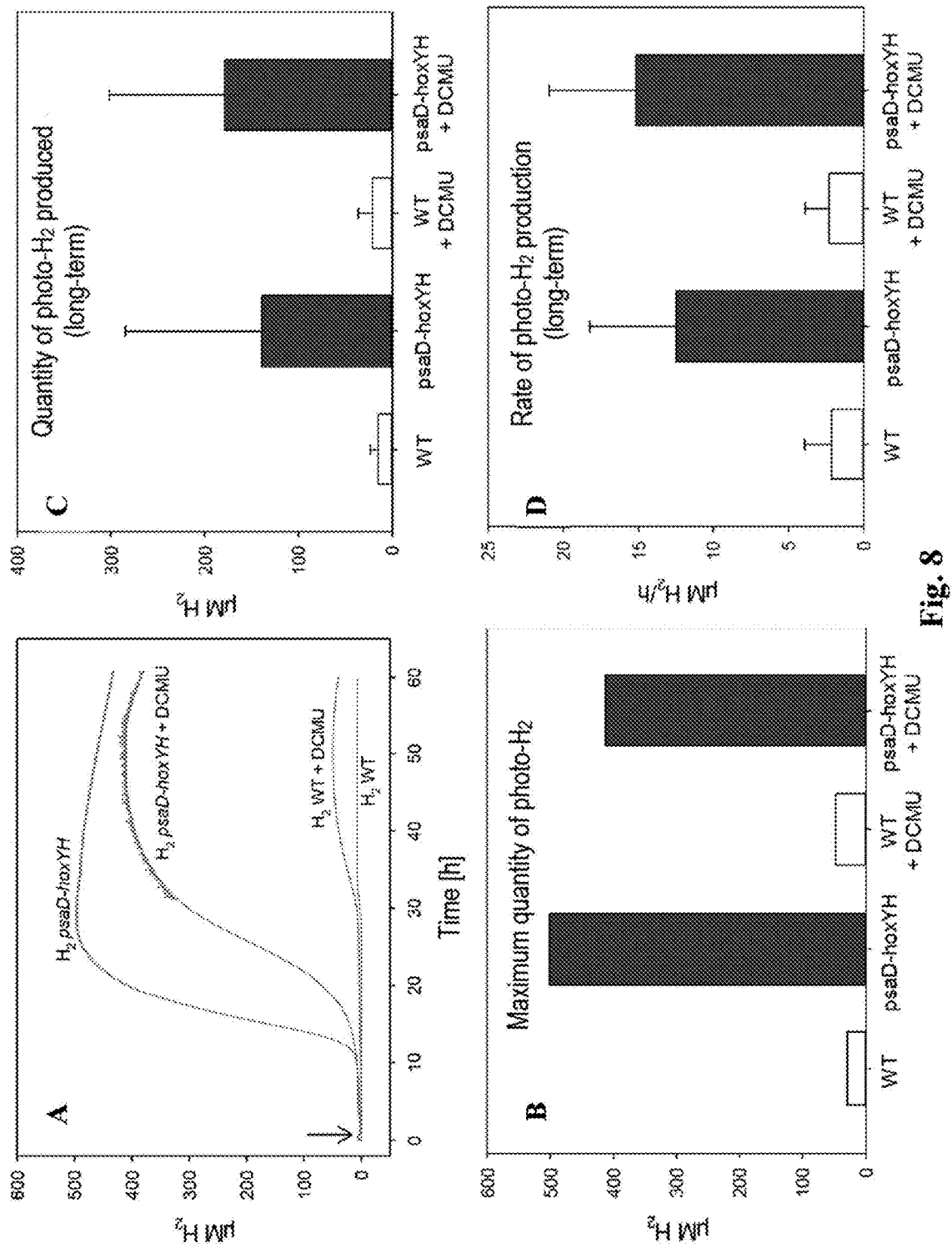

FIG. 8: Long-term photo-$H_2$ production in-vivo in wild type (WT) and psaD-hoxYH under anaerobic conditions with constant lighting in the presence and absence of DCMU. The anaerobic conditions were obtained by adding glucose, glucose oxidase and catalase. (A) Long-term photo-$H_2$ production in WT and psaD-hoxYH. (B) Highest quantities of photo-$H_2$ produced (under long-term conditions) by WT and psaD-HoxYH. (C) Average quantity of photo-$H_2$ which was produced by WT and psaD-HoxYH (under long-term conditions). (D) Average rate of photo-$H_2$ produced (under long-term conditions) by WT and psaD-hoxYH.

Figure 9:
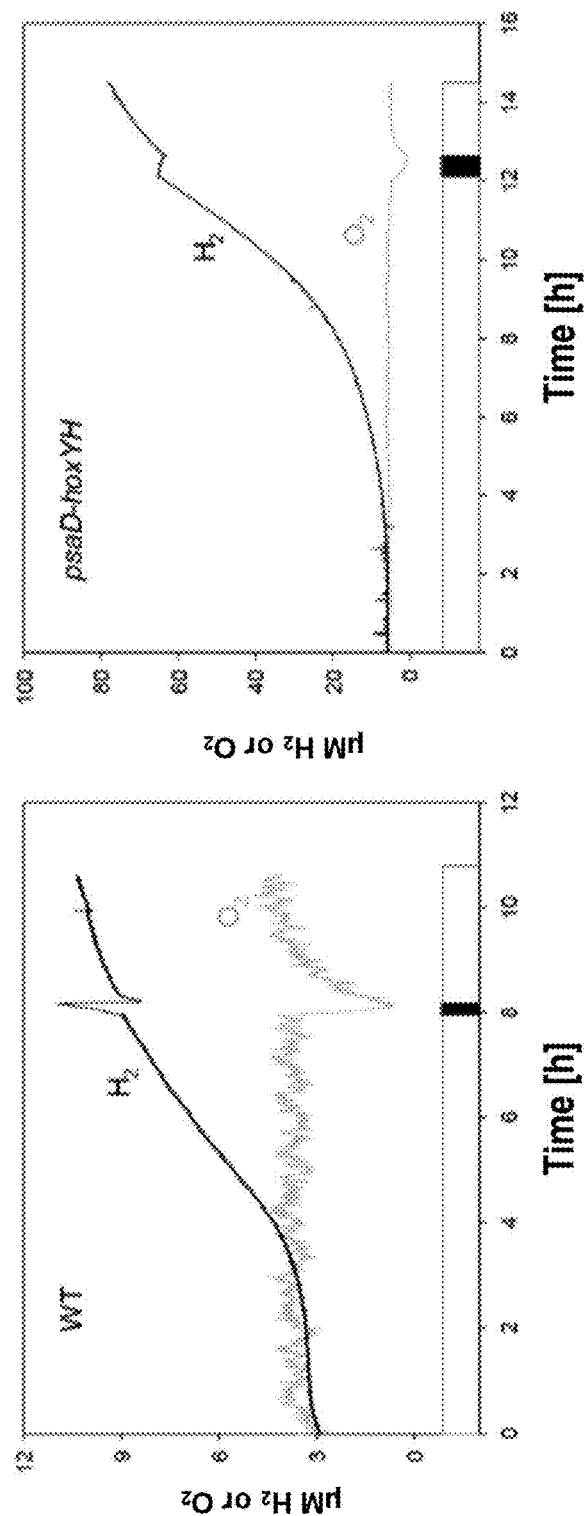

FIG. 9: Light dependency of long-term in-vivo photo-$H_2$ production in wild type (WT) and psaD-hoxYH under anaerobic conditions in constant lighting in the absence of DCMU. Anaerobic conditions were obtained by the addition of glucose, glucose oxidase and catalase. The light was switched off, shown by the dark bars, and then switched on again. The decay in oxygen concentration in darkness was induced by the ending of $H_2O$ splitting at PSII. While the wild type still produced $H_2$ by transferring to fermentative $H_2$ production, $H_2$ production stopped completely with psaD-hoxYH in darkness.

Figure 10:
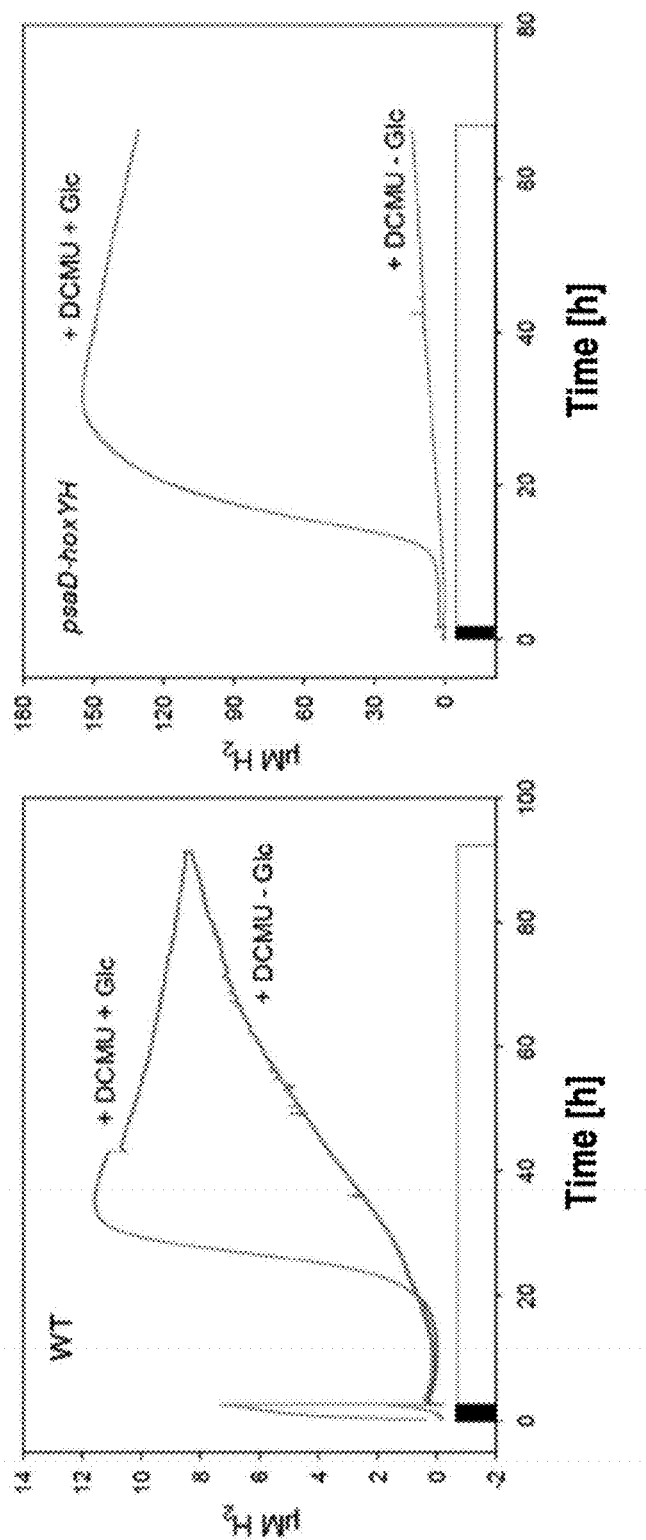

FIG. 10: Long-term photo-$H_2$ production in wild type (WT) and psaD-hoxYH in presence of DCMU with or without glucose. The black bars show a dark phase with fermentative $H_2$ production in the WT at the beginning of the experiment. Anaerobic conditions were obtained before beginning the measurements by flushing the cultures with argon for 10 minutes. The different scales in the two figures should be noted.

FIG. 11. Table 1 with primers employed.

Figure 12:
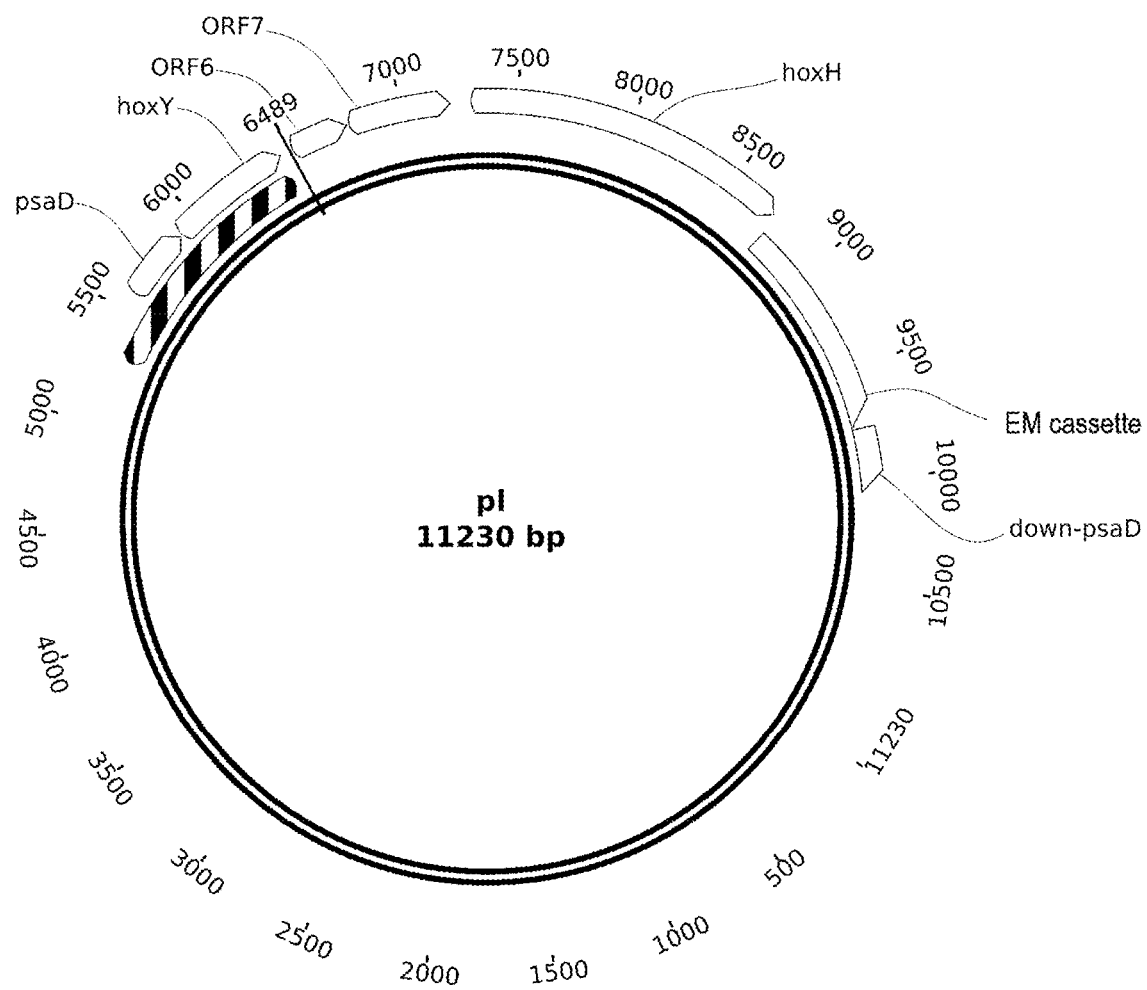

FIG. 12. Example of a vector construct for genetic modification of a cyanobacterial cell in accordance with the invention.

EXAMPLE

The in-vivo photo-$H_2$ production in cyanobacteria and green algae was restricted by (1) the sensitivity of the enzyme to oxygen, (2) the rapid uptake of photo-$H_2$ in light and (3) the transfer of electrons from the photosystem I (PSI) to competing metabolism processes such as nitrogen assimilation and $CO_2$ fixation, for example (5, 9, 11). In order to circumvent the aforementioned restrictions and to maximize the photo-$H_2$ production in-vivo, the bidirectional NiFe-$H_2$ase (Hox hydrogenase) from *Synechocystis* was fused in-vivo with the endogenous PSI in the cyanobacterium *Synechocystis* sp PCC 6803 (hereinafter *Synechocystis*). In this example, HoxYH was fused with the PSI component PsaD.

It was previously shown that the turnover frequency (TOF) of this hydrogenase in-vivo is large enough to maintain the supply of electrons at the PSI step (25). Bidirectional NiFe hydrogenase (Hox hydrogenase) consists of a diaphorase portion (HoxEFU) and a hydrogenase portion (HoxYH). The diaphorase contains several 2Fe2S and 4Fe4S clusters, which mediate electron transfer from soluble electron donors such as ferredoxin, flavodoxin, NADPH and NADH to the 4Fe4S cluster of HoxY, which then reduces the active centre of NiFe into HoxH for the production of $H_2$ (5, 7, 26-28). It has already been reported that the hydrogenase unit alone forms a hydrogenase (HoxYH) which, in the presence of the synthetic electron donor methylviologen (MV) can develop $H_2$ in-vitro (28, 29). The deletion of diaphorase subunits in-vivo leads, however, to a reduced hydrogen production, which is probably caused by a reduced electron transfer to the active centre as well as unstable hydrogenase complexes (26, 30). Thus, in a preliminary experiment, a test was carried out as to whether the hydrogenase (HoxYH) alone could be expressed in a stable and active manner in-vivo, with the aim of then fusing only HoxYH to PSI.

Materials and Methods

Construction of Plasmids

All of the primers used are listed in Table 1 (see FIG. 11). PCR products of the upstream and downstream regions of the Hox operon and psaD were produced together with those of kanamycin and gentamycin-resistance cassettes ("Km cassette", "Gm cassette"). The three products were then linked by means of a "Gibson assembly" (52) with pUC19 to form pDHOX and pDPSAD. In order to produce an expression construct for hoxYH PCR products from upstream and downstream regions of the Hox operon, the trc promoter (trp-lac promoter) and hoxYH with a 5'-extension, which coded for the Strep-Tag, were amplified and composed into a Gibson Assembly with pBluescript SK-, which had been cut with KpnI and SacI, into a plasmid. In the case of the construct for the fusion of hoxY an psaD, four PCR products were produced: psaD up to the desired fusion site, the hydrogenase gene (hoxY, ORF6, ORF7 and hoxH) from the second codon of hoxY, the erythromycin-resistance cassette ("Em cassette") and a downstream region of psaD (see FIG. 12). These four fragments were assembled in a single step by TAR cloning (53) in pMQ80 (54), which had been cut by EcoRI and NaeI. In contrast to the original protocol, the fragments only had 40 bp overlaps. For the cloning process itself, the protocol of (55) was employed. In brief, a single colony of the yeast strain BJ5464 was cultured overnight at 30° C. on a rotary shaker with 200 UpM in 50 mL of YPD (1% yeast extract, 2% peptone, 2% glucose). The next day, the culture medium was diluted to a density of $OD_{600}$=0.5. The cells had grown to a density of $OD_{600}$=2 in approximately 4 h and were harvested at 3000×g for 5 min. The cells were washed twice in 25 mL of sterile water and once in 1 mL of sterile water and then pelletized for 30 seconds at 13000×g in a 1.5 mL beaker. Finally, the pellet was re-suspended in 1 mL of sterile water and 100 μL of cells were divided per transformation into separate beakers. A mixture of 240 μL 50% (wt./vol.) PEG 3350, 36 μL 1 M lithium acetate, 50 μl 2 mg/mL denatured salmon sperm DNA and 34 μL DNA was added to the cells, and the mixture was vigorously stirred. 2 μg of plasmid was used and the various fragments were added to the plasmid in a molar ratio of 1:1. After incubating for 40 minutes at 42° C., the cells were pelletized for 30 seconds at 13000×g, re-suspended in 500 μL of sterile water and plated out onto yeast drop out medium without uracil. All of the colonies which had grown after 3 to 4 days incubation at 30° C. on a single plate were washed from the plate with sterile water. The cells were pelletized and the DNA was isolated using standard protocols. With this DNA, chemically competent *Escherichia coli* DH5α was transformed and selected on the respective antibiotic. Plasmids were purified out of the resulting colonies. All of the constructs obtained were tested by sequencing.

Production and Growth of Strains

Wild type cells from *Synechocystis* sp. PCC 6803 were transformed in accordance with (56) one after the other with pDHOX and pDPSAD, in order to delete all Hox genes and psaD. The wild type cells and Δhox cells were cultured at 50 μE·m2·s$^{-1}$ on BG-11 agar plates and in bubble culture or in shaking culture. Cells transformed with pDPSAD were cultured at 5 μE·m2·s$^{-1}$ on plates with 10 mM glucose. After segregation, the ΔhoxΔpsaD-strain was transformed at 10

μE·m2·s⁻¹ in bubble culture without glucose and transformed with construct I. In this case, the cells were cultured in shaking culture (100 UpM) for approximately three days at 5 μE·m2·s⁻¹ with 10 mM glucose, before they were plated out onto BG-11 with 10 mM glucose and 20 μg/mL erythromycin. The plates were kept for a few weeks at 5 μE·m2·s⁻¹, before colonies appeared. The segregation of all of the resulting strains was either checked using PCR or Southern blot. The successful transformation of the Δhox and fusion strains was also checked by measurement of their hydrogenase activity.

Hydrogen Measurements

The hydrogenase activity was measured in whole cells in the presence of 10 mM dithionite and 5 mM of methylviologen with a hydrogen electrode as described in (25). The short and long-term hydrogen conversion was measured with the MicroRespiration System (Unisense, Aarhus, Denmark). Cells which had been cultured at 10 μE·m2·s⁻¹ under a constant stream of air bubbles were harvested by centrifuging for 10 minutes at 5000 U/min and re-suspended in fresh BG-11. The chlorophyll content was determined (25) and adjusted to 20 μg/mL. Cell suspensions were placed in MicroRespiration double chamber and glucose, glucose oxidase and catalase were added in final concentrations of 10 mM, 16 U/mL or 20 U/mL. After inserting an oxygen and a hydrogen electrode into each chamber, the measurement was begun.

Determination of NAD (P)/NAD(P) Ratios

The NAD(P)H/NAD(P)+ ratios were determined with the colorimetric NADPH/NADP and NADH/NAD quantification kits from BioVision (California, USA). The cultures were grown under fermentative conditions either in BG11 medium or in BG110 medium, which contained 5 mM arginine and 10 mM glucose. An equivalent of approximately 1.0×10⁹ cells/mL (10 mL culture with an $OD_{750}$ of 1) was harvested at 3500 g for 10 minutes at −9° C. The pellets were resuspended in 1 mL 20 mM cold PBS-Puffer and centrifuged for 1 min at −9° C. at 12000 g. The pellet was resuspended in 50 μL of extraction buffer (BioVision, California, USA) and pre-cooled glass beads (diameter 0.18 mm) were added close to the surface (0.5-1 mm) of the liquid. The mixture was swirled 4 times for 1 min at 4° C., cooling in between for 1 min on ice. A fresh 150 μL of extraction buffer was added and the mixture was centrifuged at 3500 g, −9° C. The liquid phase was, as far as possible, transferred into a new reaction vessel and centrifuged for 30 minutes at −9° C. at maximum speed. The residue was transferred into pre-cooled 10 kD spin columns (BioVision, California, USA). The sample was centrifuged for 10 min at 10000 g, −9° C. The flux through the liquid was divided into two 30 μL portions. One was incubated with 30 μL NADH extraction buffer (BioVision, California, USA) for 30 minutes at 60° C. and immediately cooled on ice, and was then rapidly centrifuged in order to remove any precipitate, in order to determine the quantity of NADH in the cells. For the other, 30 μL of NADH extraction buffer (BioVision, California, USA) was placed on ice. Two 25 μL heated and two 25 μL unheated samples were placed in four wells of a 96-well mictotitre plate. For the concentration control, 2.5 μL of all of these samples was placed in wells with 22.5 μL of NADH extraction buffer. 50 μL NAD "Cycling Mix" (BioVision, California, USA) was mixed well and pipetted into each well and incubated for 5 minutes at room temperature. Next, 10 μL of NADH developer (BioVision, California, USA) was added to each well and incubated for 1 to 4 hours before the absorption was measured at 450 nm using a TECAN-GENios instrument (TECAN Group Ltd., Austria). The reactions were stopped after adding 5 μL of stop solution (BioVision, California, USA) to each well. The colour should have been made stable for 48 h with the stop solution and was sealed with film at 4° C. The plates were then read at OD 450 nm. The values were collected using Magellan (TECAN) software. 10 μL of 1 nmol/μL of NADH standard was diluted with 990 μL of NADH/NAD extraction buffer in order to produce 10 pmol/μL of standard NADH. The addition of 0, 1, 2, 3, 4, 5 μL of the diluted standard to labelled 96-well plates, in duplicate, produced 0, 20, 40, 60, 80, 100 pmol/Well standards. A final volume of 25 μL was obtained after adding NADH/NAD extraction buffer. All of the diluted NADH standards were treated in the same way as the aforementioned samples. NADPH/NADP quantifications were carried out in a similar manner with the NADPH/NADP "Quantification Colorimetric Kit" from BioVision (BioVision, California, USA).

Results

Validation of In-Vivo Electron Donor for the Bidirectional Cyanobacteria-NiFe Hydrogenase FeFe-H₂ases from green algae have long been known to produce hydrogen with the aid of reduced ferredoxin, while for several decades it was assumed that the bidirectional cyanobacteria NiFe hydrogenase formed hydrogen via NAD(P)H. The latter enzyme was therefore seen to be less attractive for biotechnological applications because with reduced ferredoxin compared with NAD(P)H, much higher $H_2$ concentrations could be produced.

Based on experimental data and theoretical assumptions, it is now maintained that the bidirectional cyanobacterial NiFe hydrogenase also produces hydrogen, to the detriment of the reduced ferredoxin (5). However, these statements were then called into question because of contradicting data which claimed that NAD(P)H (albeit employed in non-physiologically high concentrations) rather than reduced ferredoxin was confirmed as the electron donor for the cyanobacterial enzyme (6). Thus, fresh investigations to find the electron donor for bidirectional NiFe-H₂ase were undertaken, this time in an in-vivo approach.

Cells were cultured on either nitrate ($NO_3^-$) or alternatively on arginine as the source of nitrogen. Nitrate is reduced by ferredoxin in cyanobacteria (31). Thus, it can be assumed that the ferredoxin pool in cells which are cultured with arginine is reduced more strongly. Correspondingly, fermentative $H_2$ production under these conditions was raised seven-fold (3.2 μM $H_2$ ($NO_3^-$); 21.2 μM $H_2$ (Arg)) (see Table 2), which indirectly again indicates that reduced ferredoxin is the electron donor (FIG. 1). Until now, however, there have not been any methods to hand with which the $Fdx_{ox}/Fdx_{red}$ ratio could be determined in-vivo. Therefore, NADH/NAD⁺- and NADPH/NADP⁺ ratios were determined at the same time as $H_2$ production. In order to produce 20 μM $H_2$ at a pH of 7 (measured on arginine), NAD(P)H/NAD(P)⁺ ratios of 50 or instead a $Fdx_{red}/Fdx_{ox}$ ratio of 0.001 was necessary (32). These values are far higher than the measured ratios for NADH/NAD⁺ of 0.039 ($NO_3^-$) and 0.3 (Arg) (see Table 2, FIG. 1) and NADPH/NADP⁺ of 0.058 ($NO_3^-$) and 0.08 (Arg) (see Table 3, FIG. 1).

Table 2: NADH/NAD⁺ ratios for fermentative $H_2$ production by means of *Synechocystis* during culture on nitrate or arginine as the source of nitrogen. Measured values compared with theoretical values obtained from thermodynamic considerations.

| $NO_3^-$ /Arg | NADH/NAD$^+$ | µM H$_2$ theor. | µM H$_2$ measured |
|---|---|---|---|
| $NO_3^-$ | 0.039 | 0.01 | 3.2 |
| Arg | 0.3 | 0.13 | 21.2 |

Table 3: NADPH/NADP$^+$ ratios for fermentative H$_2$ production by means of *Synechocystis* during culture on nitrate or arginine as the source of nitrogen. Measured values compared with theoretical values obtained from thermodynamic considerations.

| $NO_3^-$ /Arg | NADH/NAD$^+$ | µM H$_2$ theor. | µM H$_2$ measured |
|---|---|---|---|
| $NO_3^-$ | 0.058 | 0.025 | 3.2 |
| Arg | 0.08 | 0.03 | 21.2 |

The measured NAD(P)H/NAD(P)$^+$ ratios agree well with data from the literature, which give NADH/NAD$^+$ ratios in *E. coli* of 0.5 and 0.7, 0.25 and 0.05 in *Synechocystis* and NADPH/NADP$^+$ ratios of 0.05 in *Synechococcus* under fermentative conditions (33-36). According to thermodynamic calculations, H$_2$ could be produced at a NADH/NAD$^+$ ratio of 0.3 (Ag) 0.13 µM H$_2$ and at a NADPH/NADP$^+$ ratio of 0.08 (Arg) 0.03 µM (Table 3, FIG. 1) (32). The measured NAD(P)H/NAD(P)$^+$ ratios are therefore clearly not responsible for the observed H$_2$ production of 20 µM, whereas the required Fdx$_{red}$/Fdx$_{ox}$ ratio of 0.001 in cells should be readily obtainable. It may therefore be that NAD(P)H is responsible for the production of small quantities of H$_2$, exerts an activating action on hydrogenase and takes part in a bifurcation reaction together with ferredoxin (5, 7, 37). The above results clearly show, however, that reduced ferredoxin must be responsible for the production of large quantities of H$_2$ and that the bidirectional cyanobacterium NiFe hydrogenase is therefore a biotechnologically attractive enzyme.

Expression of Hydrogenase (HoxYH) Unit In-Vivo

In order to test whether hydrogenase (HoxYH) can be expressed in-vivo in a stable and active manner, HoxYH was overexpressed under the control of a trc promoter in a Δhox deletion strain of *Synechocystis*. The corresponding Δhox/hoxYH mutant expressed an active hydrogenase in-vivo, as could be shown by methylviologen-based enzyme tests (FIG. 2A). However, the mutants were not able to produce fermentative hydrogen with their natural electron donors (FIG. 2B) and in-vivo exhibited a reduced capacity for photo-H$_2$ production (FIG. 2C).

The latter results were in line with expectations, because diaphorase is responsible for an effective transfer of electrons from the redox pairs to the hydrogenase. Because HoxYH could be expressed actively and in a stable manner in-vivo, however, an approach was developed whereby only these subunits were fused with PSI.

Construction of a PSI-H$_2$Ase Fusion Product

The efficiency of the electron transfer between Fe—S clusters depends primarily on the distance between the redox centres, which should ideally be less than 14 Å (38). The vicinity of redox centres is more decisive than its mean potential (39). Shortening the distances from the 14 Å limit enables increasingly endergonic electron transfer steps (38). In contrast to in-vitro tests, the hydrogenase at the PSI in-vivo has to compete successfully with ferredoxin for electrons. The PSI is composed of several subunits, of which PsaA and PsaB are the two largest, which form a heterodimeric reaction centre with the chlorophyll pair P700 and the electron transfer components chlorophyll A$_0$, phylloquinone A$_1$ and the 4Fe-4S cluster F$_X$ (40). Three smaller soluble subunits PsaC, PsaD and PsaE are bonded to the reaction centre on the cytoplasm side. PsaC contains two 4Fe-4S clusters F$_A$ and F$_B$. In the photosynthetic electron transport chain, plastocyanin releases electrons directly to the reaction centre and P700. The electrons are transferred from P700 via A$_0$, A$_1$, F$_X$, F$_A$ and F$_B$ to the soluble electron carrier ferredoxin (see FIG. 7 as well). The binding site of ferredoxin is in a pouch formed by PsaE, PsaC and PsaD (FIG. 3) (40-42). In their in-vitro assay, Ihara et al. (2006) bound the NiFe hydrogenase of *Ralstonia* to the C-terminus of PsaE which is remote from the ferredoxin binding site. This may be a reason for the preferred electron transfer onto ferredoxin instead of the hydrogenase in this fusion construct (20). In order to place the 4Fe-4S cluster of HoxY in the immediate vicinity of the 4Fe-4S cluster F$_B$ of PsaC, HoxY was fused with the C-terminus of the PsaD shortened by 35 amino acids up to glutamate 103, which is orientated in the F$_B$ direction, in which it surrounds PsaC in the manner of a clamp (FIG. 3) (43, 44).

The N-terminus of HoxY was fused directly to the glutamate 103 of PsaD without a linker. In order to coarsely estimate the distance between the 4Fe-4S cluster F$_B$ in PsaC and the 4Fe-4S cluster of HoxY in the fusion construct, the distances of the 4Fe-4S clusters to the amino acids on the surface of the respective proteins was determined and added. The largest separation within HoxY was approximately 33 Å to its N-terminus and the shortest separation was 13 Å to Tyr155 (45). Within PsaC, the largest separation was 12.2 Å to Pro29 and the shortest separation was 10.7 Å to Val28 or 10.3 Å to Glu26 (44). As a function of the in-vivo orientation of HoxY with respect to PsaC, it can be estimated that the 4Fe-4S cluster has a distance of approximately 23.3 Å (13+10.3) to 45.2 Å (33+12.2), which is well over the desired limit of 14 Å (38).

In-Vivo Assembly of PsaD-HoxYH onto PSI

In order to obtain a *Synechocystis* mutant into which the psaD-hoxYH fusion could finally be introduced, both the complete Hox gene cluster (hoxEFUYH) as well as the PSI subunit psaD were deleted, which produced a ΔhoxΔpsaD mutant (hereinafter: ΔhoxΔpsaD). The respective mutant was segregated in low lighting conditions (5 µE·m2·s$^{-1}$) in the presence of 10 mM glucose. Next, a fusion construct (see FIG. 12) produced from psaDhoxYH in ΔhoxΔpsaD was introduced in order to complement PsaD and to obtain the mutant ΔhoxΔpsaD/psaD-hoxYH. The mutant ΔhoxΔpsaD/psaD-hoxYH will be abbreviated here to psaD-hoxYH. The aim was to develop a mutant which preferentially transferred electrons from the photosynthesis electron transport chain to the hydrogenase (HoxYH) without completely blocking the PSI for other electron acceptors which are responsible for fixing CO$_2$ and for photoautotrophic growth. In earlier studies, it was shown that the deletion or modification of the PSI subunit PsaD results in mutants with reduced PSI stability, reduced ferredoxin affinity and NADP$^+$ photoreduction. However, these mutants could still grow under photoautotrophic conditions, albeit in some cases at extremely low rates (46, 47).

FIG. 12 is diagrammatic and shown as an example of the structure of the plasmid for introducing a fusion of hoxYH onto PsaD. The sequence corresponds to the sequence in accordance with SEQ ID NO: 31. The shortened sequence of psaD borders directly onto hoxY, followed by two open reading frames (ORF6, ORF7), which are located in the operon of the Hox gene (hoxEFUYH) and the function of which is unclear. The hoxH is adjacent, followed by a resistance cassette against the antibiotic erythromycin (EM cassette), which is used in order to build up selection pressure. In order to be able to integrate the construct into the correct position in the genome by homologous recombination, the sequence was integrated into the vector once downstream of PsaD (down PsaD) and upstream of PsaD (hatched).

Characterization of psaD-hoxYH
Photoautotrophic Growth of psaD-hoxYH

We tested the photoautotrophic growth of WT, ΔhoxΔpsaD and psaD-hoxYH in the absence of external carbohydrate sources in low (10 $\mu E \cdot m2 \cdot s^{-1}$) and medium (100 $\mu E \cdot m2 \cdot s^{-1}$) lighting. ΔhoxΔpsaD could grow slowly under poor lighting conditions, but barely grew at the higher light intensity (FIG. 4), which agrees well with earlier reports regarding the growth of a ΔpsaD mutant of *Synechocystis* (46). Complementing ΔhoxΔpsaD with psaD-hoxYH resulted in a mutant which grew better under low lighting and furthermore exhibited a photoautotrophic growth at 100 $\mu E\ m2 \cdot s^{-1}$ lighting, albeit at lower rates than the wild type (FIG. 4).

Hydrogenase Activity of psaD-hoxYH

In order to test whether the psaD-hoxYH fusion mutant expressed a functional hydrogenase, the $H_2$ production was measured in the presence of the artificial reduced electron donor methylviologen (MV). With this assay, functional hydrogenases could be quantified in cells. The hydrogen production in psaD-hoxYH was raised compared with the wild type, which was expected, because HoxYH was expressed under the control of a promoter of the PSI subunit (psaD) which should be stronger than the promoter for the hydrogenase operon (FIG. 5A).

In order to test whether the hydrogenase (HoxYH) in psaD-HoxYH is bonded via PSI to the thylakoid membrane as desired, cells were ruptured and the hydrogenase activity was initially measured in whole cell homogenates and then both in the soluble and also in the membrane fraction. In the wild type, the hydrogenase activity was virtually limited to the soluble fraction (97%) with little activity in the membrane fraction (3%) (FIG. 5B). In contrast to this, in psaD-hoxYH the most hydrogenase activity was found in the membrane fraction (67%), and lower activities (16%) were measured in the soluble fraction, which confirmed successful binding of HoxYH to the thylakoid membrane via PSI (FIG. 5B). Because of the loss of activity upon the separation of the two fractions, the values do not add up to 100%.

In-Vivo Hydrogen Production
Fermentative $H_2$ production and short-Lived photo-$H_2$ Production Upon Irradiation In vivo $H_2$ production was monitored with $H_2$ sensors (Unisense) in the wild type and psaD-hoxYH. In contrast to the wild type, with psaD-hoxYH under dark anaerobic conditions, as expected, no fermentative $H_2$ production was observed, because in psaD-hoxYH, diaphorase (HoxEFU), which is responsible for the electron transfer from the in-vivo electron donor to the active centre of the hydrogenase, is missing (FIG. 6) (26). Because of binding to the PSI, it can also be considered that the 4Fe-4S cluster of HoxY is difficult for electrons other than those from PSI to access.

Under illumination, photo-$H_2$ was produced both in the wild type (1.8 $\mu M\ H_2 \pm 0.7$; n=17) as well as in psaD-HoxYH (1.1 $\mu M\ H_2 \pm 0.5$; n=22) (FIG. 6A-C). The mutants had a much slower photo-$H_2$ production rate (11.5 $\mu M\ H_2/h \pm 4.9$) compared to the wild type (260 $\mu M\ H_2/h \pm 143$), which indicates that the transfer of electrons between PSI and HoxYH in the case of psaD-hoxYH is less effective than in the wild type and could be optimized further (FIG. 6D). The poorer electron transfer could be due to the estimated distance of 23 Å to 45 Å between the 4Fe4S clusters of HoxY and $F_B$, which is over the target limiting value of 14 Å (38). However, while the wild type consumed the photo-$H_2$ within a few minutes, the psaD-hoxYH culture maintained a high photo-$H_2$ level for several hours (FIG. 6A-B). This is in agreement with the concept that the hydrogenase in the WT takes up electrons for the photo-$H_2$ production, then catalyses the reverse reaction and possibly feeds electrons back via the diaphorase and the photosynthesis complex 1 (NDH-1) into the photosynthetic electron chain (6, 7, 48). The immobility of HoxYH in psaD-HoxYH together with the lack of diaphorase is therefore highly probably responsible for the lack of photo-$H_2$ pickup. The oxygen contents in the cultures were kept low by adding glucose and glucose oxidase and catalase to consume the oxygen, in order to prevent inactivation of the hydrogenase. Electrons dissipated from the glucose oxidation can enter the photosynthetic inter-system chain (for example via the photosynthetic complex I, NDH1) and finally reach the PSI for photo-$H_2$ production (see FIG. 7). This process contains exclusively PSI without the formation of oxygen and therefore enables photo-$H_2$ production on the basis of an anoxygenic photosynthesis. In order to test whether the observed photo-$H_2$ is based on either oxygenic or anoxygenic photosynthesis or on both, DCMU was added, which specifically inhibits electron transfer from photosystem II (PSII) into the plastoquinone pool (PQ) (7). The addition of DCMU reduced the photo-$H_2$ production both in the wild type and also in psaD-hoxYH, but did not cancel this completely, which confirms that PSII probably delivers electrons from the $H_2O$ oxidation for photo-$H_2$ production in addition to another source.

Long-Term Photo-$H_2$ Production Under Anaerobic Conditions with Constant Lighting When WT and psaD-hoxYH cultures were left for several days under anaerobic conditions in constant lighting, a second photo-$H_2$ production phase was observed in which both in WT (average of 15 $\mu M\ H_2 \pm 8.3$; n=8) and also, most impressively, in psaD-hoxYH (average 139 $\mu M\ H_2 \pm 146$; n=16), much higher quantities of photo-$H_2$ were formed (FIG. 8). The $H_2$ concentrations reached fluctuated relatively severely and in WT were between 6 $\mu M\ H_2$ and 29 $\mu M\ H_2$ and in psaD-hoxYH between 32 $\mu M\ H_2$ and 500 $\mu M\ H_2$. The comparison of the maximum $H_2$ concentrations which were obtained from the WT (23 $\mu M\ H_2$) and psaD-hoxYH (500 $\mu M\ H_2$) exhibited a 22-fold rise in the level of $H_2$ in the mutant (FIG. 8B). Interestingly, in contrast to the situation with short-term photo-$H_2$ production, the mutants exhibited significantly higher rates of $H_2$ production (12.5 $\mu M\ H_2/h \pm 5.8$; n=16) compared with WT (2.1 $\mu M\ H_2/h \pm 1.8$; n=6) (FIG. 8C). Typically, photo-$H_2$ production in the mutant began sooner than compared with WT (FIG. 8A and FIG. 10). To the knowledge of the inventors, the highest in-vivo concentration measured for *Synechocystis* cultures until now was approximately 50 $\mu M\ H_2$ (11). By far the best cyanobacterial $H_2$ producer identified up to now is the filamentary cyanobacterium *Lyngbya aestuarii*, which under fermentative conditions in-vivo, in the absence of externally added reducing agents, reached concentrations of 160 $\mu M\ H_2$ (49).

In order to test whether the observed $H_2$ production was genuinely light-dependent, WT and psaD-hoxYH were initially left under anaerobic conditions with constant lighting until $H_2$ production began. The light was switched off as soon as the $H_2$ production reached high rates. The oxygen concentration dropped immediately because of the interrupted $H_2O$ splitting at PSII in darkness (FIG. 9).

The wild type still produced $H_2$ in darkness (even at higher rates), probably by switching to fermentative $H_2$ production. In contrast, PsaD-hoxYH stopped $H_2$ production entirely in darkness. Both cultures recommenced $H_2$ production at the earlier rates as soon as the light was switched on again (FIG. 9). The long-term photo-$H_2$ production is thus clearly light-dependent, at least with psaD-HoxYH.

Next, the possible dependency of the observed long-term photo-$H_2$ production on the oxygenic photosynthesis with a contribution from PSII was investigated. To this end, DCMU was added to the cultures; this specifically inhibits electron transfer from PSII to plastoquinone and therefore ends $H_2O$ splitting at PSII (see FIG. 7). The observed results were not always consistent, because in some cases, DCMU reduced the quantity of photo-$H_2$ produced (for example FIG. 8A), whereas in most cases the photo-$H_2$ level rose even in the presence of DCMU (FIG. 8C). Because DCMU did not clearly inhibit the long-term photo-$H_2$ production, however, this process is clearly not primarily dependent on $H_2O$ oxidation at PSII.

Because glucose, glucose oxidase and catalase were present in the measured cultures, in order to keep the oxygen content low, we tested the influence of glucose on the observed $H_2$ production further. Unfortunately, in this case there were only two possibilities for keeping cultures anaerobic for several days in constant lighting: (1) Adding DCMU in order to block $O_2$ development at PSII, or alternatively (2) adding glucose, glucose oxidase and catalase. Flushing cultures with $N_2$ or argon in order to obtain anaerobic conditions would also have driven $H_2$ out of the cultures and therefore rendered $H_2$ measurements impossible. Thus, DCMU was added to the cultures in order to inhibit $O_2$ production at PSII and to observe the influence of external glucose on the $H_2$ production. In order to induce anaerobic conditions in the absence of glucose, prior to beginning the $O_2$ and $H_2$ measurements, all of the cultures were flushed with argon for 10 min. In WT, similar $H_2$ levels were produced in the presence and absence of glucose, while the production rates with glucose were much higher (FIG. 10). In the absence of glucose, psaD-hoxYH produced similar quantities of $H_2$ to the wild type, while in the presence of glucose, concentrations were obtained which were 10 times higher (FIG. 10).

Sequences (see also Table 1 in FIG. 11):

| Primer | SEQ ID NO: |
|---|---|
| hoxout1 | 01 |
| hoxin1Km | 02 |
| Km1 | 03 |
| Km2 | 04 |
| hoxin2Km | 05 |
| hoxout2 | 06 |
| pB-Trc-fw | 07 |
| pB-Tre-rev NEU | 08 |
| pB-NStrep-YH-fw NEU | 09 |
| pB-NStrep-YH-rev | 10 |
| pB-Gm-fw | 11 |
| pB-Gm-rev NEU | 12 |
| Hox-out1pB | 13 |
| hoxin1pB | 14 |
| hoxin2pB | 15 |
| hoxout2pB | 16 |
| PsaDout1 | 17 |
| psaDin1 | 18 |
| Gm1 | 19 |
| Gm2 | 20 |
| psaDin2 | 21 |
| PsaDout2 | 22 |
| Eco-PsaDout1 | 23 |
| HoxY-PsaD | 24 |
| PsaD-HoxY | 25 |
| Em-HoxH | 26 |
| PsaD-Em | 27 |
| HoxH-Em | 28 |
| Em-PsaD | 29 |
| NaeI-PsaDout2 | 30 |
| hoxYH-psaD-Plasmid | 31 |

REFERENCES

1. D. C. Catling, C. R. Glein, K. J. Zahnle, C. P. McKay, Why O2 Is Required by Complex Life on Habitable Planets and the Concept of Planetary "Oxygenation Time". Astrobiology 5, 415-438 (2005).
2. P. G. Falkowski, L. V. Godfrey, Electrons, life and the evolution of Earth's oxygen cycle. Philosophical Transactions of the Royal Society B-Biological Sciences 363, 2705-2716 (2008).
3. E. A. Peden et al., Identification of Global Ferredoxin Interaction Networks in Chlamydomonas reinhardtii. Journal of Biological Chemistry 288, 35192-35209 (2013).
4. A. Sawyer, M. Winkler, Evolution of Chlamydomonas reinhardtii ferredoxins and their interactions with [FeFe]-hydrogenases. Photosynthesis Research 134, 307-316 (2017).
5. K. Gutekunst et al., The Bidirectional NiFe-hydrogenase in Synechocystis sp. PCC 6803 Is Reduced by Flavodoxin and Ferredoxin and Is Essential under Mixotrophic, Nitrate-limiting Conditions. Journal of Biological Chemistry 289, 1930-1937 (2014).
6. I. Dutta, W. F. J. Vermaas, The electron transfer pathway upon $H_2$ oxidation by the NiFe bidirectional hydrogenase of Synechocystis sp. PCC 6803 in the light shares components with the photosynthetic electron transfer chain in thylakoid membranes. International Journal of Hydrogen Energy 41, 11949-11959 (2016).
7. L. Cournac, G. Guedeney, G. Peltier, P. M. Vignais, Sustained Photoevolution of Molecular Hydrogen in a Mutant of Synechocystis sp. Strain PCC 6803 Deficient in the Type I NADPH-Dehydrogenase Complex. J. Bacteriol. 186, 1737-1746 (2004).
8. J. Appel, S. Phunpruch, K. Steinmnller, R. Schulz, The bidierctional hydrogenase of Synechocystis sp. PCC 6803 works as an electron valve during photosynthesis. Arch Microbiol 173, 333-338 (2000).
9. V. Nagy et al., Water-splitting-based, sustainable and efficient $H_2$ production in green algae as achieved by substrate limitation of the Calvin-Benson-Bassham cycle. Biotechnology for Biofuels 11, 69 (2018).
10. A. Melis, L. Zhang, M. Forestier, M. L. Ghirardi, M. Seibert, Sustained Photobiological Hydrogen Gas Production upon Reversible Inactivation of Oxygen Evolution in the Green Alga Chlamydomonas reinhardtii. Plant Physiology 122, 127-136 (2000).
11. F. Gutthann, M. Egert, A. Marques, J. Appel, Inhibition of respiration and nitrate assimilation enhances photohydrogen evolution under low oxygen concentrations in Synechocystis sp. PCC 6803. Biochimica et Biophysica Acta (BBA)—Bioenergetics 1767, 161-169 (2007).

12. D. C. Ducat, G. Sachdeva, P. A. Silver, Rewiring hydrogenase-dependent redox circuits in cyanobacteria. Proceedings of the National Academy of Sciences 108, 3941-3946 (2011).
13. E. Reisner, D. J. Powell, C. Cavazza, J. C. Fontecilla-Camps, F. A. Armstrong, Visible Light-Driven $H_2$ Production by hydrogenases Attached to Dye-Sensitized TiO2 Nanoparticles. Journal of the American Chemical Society 131, 18457-18466 (2009).
14. M. B. Wilker et al., Electron Transfer Kinetics in CdS Nanorod-[FeFe]-Hydrogenase Complexes and Implications for Photochemical $H_2$ Generation. Journal of the American Chemical Society 136, 4316-4324 (2014).
15. M. Hambourger et al., [FeFe] Hydrogenase-Catalyzed $H_2$ Production in a Photoelectrochemical Biofuel Cell. Journal of the American Chemical Society 130, 2015-2022 (2008).
16. D. Mersch et al., Wiring of Photosystem II to Hydrogenase for Photoelectrochemical Water Splitting. Journal of the American Chemical Society 137, 8541-8549 (2015).
17. K. P. Sokol et al., Bias-free photoelectrochemical water splitting with photosystem II on a dye-sensitized photoanode wired to hydrogenase. Nature Energy 3, 944-951 (2018).
18. I. Yacoby et al., Photosynthetic electron partitioning between [FeFe]-hydrogenase and ferredoxin:NADP-oxidoreductase (FNR) enzymes in-vitro. Proceedings of the National Academy of Sciences 108, 9396 (2011).
19. C. E. Lubner et al., Solar hydrogen-producing bionanodevice outperforms natural photosynthesis. Proceedings of the National Academy of Sciences of the United States of America 108, 20988-20991 (2011).
20. M. Ihara et al., Light-driven Hydrogen Production by a Hybrid Complex of a [NiFe] Hydrogenase and the Cyanobacterial Photosystem I. Photochemistry and Photobiology 82, 676-682 (2006).
21. H. Krassen et al., Photosynthetic Hydrogen Production by a Hybrid Complex of Photosystem I and [NiFe] Hydrogenase. ACS Nano 3, 4055-4061 (2009).
22. C. E. Lubner, R. Grimme, D. A. Bryant, J. H. Golbeck, Wiring Photosystem I for Direct Solar Hydrogen Production. Biochemistry 49, 404-414 (2010).
23. L. M. Utschig, S. R. Soltau, D. M. Tiede, Light-driven hydrogen production from photosystem I-catalyst hybrids. Current Opinion in Chemical Biology 25, 1-8 (2015).
24. M. Ihara, H. Nakamoto, T. Kamachi, I. Okura, M. Maedal, Photoinduced Hydrogen Production by Direct Electron Transfer from Photosystem I Cross-Linked with Cytochrome c3 to [NiFe] Hydrogenase. Photochemistry and Photobiology 82, 1677-1685 (2006).
25. K. Gutekunst et al., In-vivo turnover frequency of the cyanobacterial NiFehydrogenase during photohydrogen production outperforms in-vitro systems. Scientific Reports 8 (2018).
26. E. C. Aubert-Jousset, Melissa; Guedeney, Genevieve; Richaud, Pierre; Cournac, Laurent, Role of HoxE subunit in Synechocystis PCC6803 hydrogenase. FEBS Journal 10.111/j.1742-4658.2011.08208.x (2011).
27. O. Schmitz et al., Molecular biological analysis of a bidirectional hydrogenase from cyanobacteria. European Journal of Biochemistry 233, 266-276 (1995).
28. L. T. Serebryakova, M. E. Sheremetieva, Characterization of catalytic properties of hydrogenase isolated from the unicellular cyanobacterium Gloeocapsa alpicola CALU 743. Biochemistry-Moscow 71, 1370-1376 (2006).
29. K. Schneider, R. Cammack, H. G. Schlegel, Content and localization of FMN, F3-S clusters and nickel in the NAD-linked hydrogenase of Nocardia opaca 1B. European Journal of Biochemistry 142, 75-84 (1984).
30. C. Eckert et al., Genetic Analysis of the Hox hydrogenase in the Cyanobacterium Synechocystis sp. PCC 6803 Reveals Subunit Roles in Association, Assembly, Maturation, and Function. Journal of Biological Chemistry 287, 43502-43515 (2012).
31. E. Flores, J. E. Frfas, L. M. Rubio, A. Herrero, Photosynthetic nitrate assimilation in cyanobacteria. Photosynthesis Research 83, 117-133 (2005).
32. K. Gutekunst, R. Schulz, "CHAPTER 4 The Physiology of the Bidirectional NiFe Hydrogenase in Cyanobacteria and the Role of Hydrogen Throughout the Evolution of Life" in Microalgal Hydrogen Production: Achievements and Perspectives. (The Royal Society of Chemistry, 2018), 10.1039/9781849737128-00107, pp. 107-138.
33. J. Biggins, Respiration in Blue-Green Algae. Journal of Bacteriology 99, 570-575 (1969).
34. M. R. de Graef, S. Alexeeva, J. L. Snoep, M. J. Teixeira de Mattos, The Steady-State Internal Redox State (NADH/NAD) Reflects the External Redox State and Is Correlated with Catabolic Adaptation in Escherichia coli. Journal of Bacteriology 181, 2351-2357 (1999).
35. G. K. Kumaraswamy et al., Reprogramming the glycolytic pathway for increased hydrogen production in cyanobacteria: metabolic engineering of NAD+− dependent GAPDH. Energy & Environmental Science 6, 3722-3731 (2013).
36. K. McNeely, Y. Xu, N. Bennette, D. A. Bryant, G. C. Dismukes, Redirecting Reductant Flux into Hydrogen Production via Metabolic Engineering of Fermentative Carbon Metabolism in a Cyanobacterium. Appl. Environ. Microbiol. 76, 5032-5038 (2010).
37. W. Buckel, R. K. Thauer, Energy conservation via electron bifurcating ferredoxin reduction and proton/Na+ translocating ferredoxin oxidation. Biochim. Biophys. Acta-Bioenerg. 1827, 94-113 (2013).
38. C. C. Page, C. C. Moser, X. Chen, P. L. Dutton, Natural engineering principles of electron tunnelling in biological oxidation-reduction. Nature 402, 47-52 (1999).
39. J. M. Hudson et al., Electron Transfer and Catalytic Control by the Iron-Sulfur Clusters in a Respiratory Enzyme, E. coli Fumarate Reductase. Journal of the American Chemical Society 127, 6977-6989 (2005).
40. I. Grotjohann, P. Fromme, Structure of cyanobacterial photosystem I. Photosynthesis Research 85, 51-72 (2005).
41. H. Kubota-Kawai et al., X-ray structure of an asymmetrical trimeric ferredoxin-photosystem I complex. Nature Plants 4, 218-224 (2018).
42. P. Fromme, H. Bottin, N. Krauss, P. Sdtif, Crystallization and electron paramagnetic resonance characterization of the complex of photosystem I with its natural electron acceptor ferredoxin. Biophysical Journal 83, 1760-1773 (2002).
43. P. Fromme, P. Jordan, N. KrauB, Structure of photosystem I. Biochim Biophys Acta 1507, 5-31 (2001).
44. P. Jordan et al., Three-dimensional structure of cyanobacterial photosystem I at 2.5 Å resolution. Nature 441, 909-917 (2001).
45. Y. Shomura et al., Structural basis of the redox switches in the NAD-reducing soluble [NiFe]-hydrogenase. Science 357, 928 (2017).

46. V. P. Chitnis, A. Ke, P. R. Chitnis, The PsaD Subunit of photosystem I (Mutations in the Basic Domain Reduce the Level of PsaD in the Membranes). Plant Physiology 115, 1699-1705 (1997).
47. B. Lagoutte, J. Hanley, H. Bottin, Multiple Functions for the C Terminus of the PsaD Subunit in the cyanobacterial photosystem I Complex. Plant Physiology 126, 307 (2001).
48. J. M. Schuller et al., Structural adaptations of photosynthetic complex I enable ferredoxin-dependent electron transfer. Science 363, 257 (2019).
49. A. Kothari, R. Potrafka, F. Garcia-Pichel, Diversity in hydrogen evolution from bidirectional hydrogenases in cyanobacteria from terrestrial, freshwater and marine intertidal environments. Journal of Biotechnology 162, 105-114 (2012).
50. D. Hoffmann, J. Maldonado, M. F. Wojciechowski, F. Garcia-Pichel, Hydrogen export from intertidal cyanobacterial mats: sources, fluxes and the influence of community composition. Environmental Microbiology 17, 3738-3753 (2015).
51. L. C. Burow et al., Identification of Desulfobacterales as primary hydrogenotrophs in a complex microbial mat community. Geobiology 12, 221-230 (2014).
52. D. G. Gibson et al., Enzymatic assembly of DNA molecules up to several hundred kilobases. Nature Methods 6, 343-U341 (2009).
53. V. N. Noskov et al., Defining the minimal length of sequence homology required for selective gene isolation by TAR cloning. Nucleic Acids Research 29 (2001).
54. R. M. Q. Shanks, N. C. Caiazza, S. M. Hinsa, C. M. Toutain, G. A. O'Toole, *Saccharomyces cerevisiae*-based molecular tool kit for manipulation of genes from gram-negative bacteria. Applied and Environmental Microbiology 72, 5027-5036 (2006).
55. R. D. Gietz, R. H. Schiestl, High-efficiency yeast transformation using the LiAc/SS carrier DNA/PEG method. Nature Protocols 2, 31-34 (2007).
56. J. G. K. Williams, CONSTRUCTION OF SPECIFIC MUTATIONS IN PHOTOSYSTEM-II PHOTOSYNTHETIC REACTION CENTER BY GENETIC-ENGINEERING METHODS IN SYNECHOCYSTIS-6803. Methods in Enzymology 167, 766-778 (1988).

The invention claimed is:

1. A phototrophic cell, which in the wild type has a native photosystem I, PSI, with PSI components and a native hydrogenase, wherein the phototrophic cell has been genetically modified to the extent that
   a) at least one of the native PSI components has been deleted,
   b) the native hydrogenase has been deleted, and
   c) at least one fusion protein is expressed which comprises i. a hydrogenase or hydrogenase component and ii. at least one PSI component, the PSI component being a PSI subunit or a N-terminally or C-terminally truncated PSI subunit, with the proviso that the PSI is complemented by expression of the at least one fusion protein and the hydrogenase component exhibits hydrogenase activity alone or together with at least one further hydrogenase component which has been expressibly introduced into the cell.

2. The phototrophic cell as claimed in claim 1, wherein the phototrophic cell has a higher photobiological hydrogen formation compared with a cell which has not been genetically modified in accordance with a), b) and c) above or compared with a wild type cell.

3. The phototrophic cell as claimed in claim 1, wherein the hydrogenase or hydrogenase component in the fusion protein is inserted into the PSI component or is disposed behind the PSI component or in front of the PSI component in the N-C direction, wherein the hydrogenase or hydrogenase component is optionally linked to the PSI component via a peptide linker.

4. The phototrophic cell as claimed in claim 1, wherein at least one of the native PSI components PsaB, PsaC, PsaD or PsaE has been deleted, and the fusion protein comprises this at least one PSI component, or a functional portion thereof, the functional portion thereof being a N-terminally or C-terminally truncated PSI subunit.

5. The phototrophic cell as claimed in claim 1, wherein the native hydrogenase is a Hox hydrogenase, and the native hydrogenase components HoxE, HoxF, HoxU, Hox Y and HoxH have been deleted.

6. The phototrophic cell as claimed in claim 5, wherein the phototrophic cell is genetically modified in a manner such that the hydrogenase components Hox Y and HoxH are expressed, and wherein the at least one fusion protein comprises the hydrogenase component Hox Y or HoxH.

7. The phototrophic cell as claimed in claim 3, wherein
   a) the hydrogenase or hydrogenase component is fused with PsaB or N-terminally or C-terminally truncated PsaB, in a manner such that the hydrogenase or hydrogenase component is orientated towards the stroma, and/or
   b) the hydrogenase or hydrogenase component is fused with PsaC, or N-terminally or C-terminally truncated PsaC, in a manner such that the hydrogenase or hydrogenase component is orientated towards the stroma, and/or
   c) the hydrogenase or hydrogenase component is fused with the C-terminus of PsaD, or N-terminally or C-terminally truncated PsaD, in a manner such that the hydrogenase or hydrogenase component is orientated towards the stroma, and/or
   d) the hydrogenase or hydrogenase component is fused with the N-terminus of PsaE, or N-terminally or C-terminally truncated PsaE, in a manner such that the hydrogenase or hydrogenase component is orientated towards the stroma.

8. The phototrophic cell as claimed in claim 1, wherein the cell is capable of dividing.

9. The phototrophic cell as claimed in claim 1, wherein the phototrophic cell is a cyanobacterial cell.

10. The phototrophic cell as claimed in claim 1, wherein the hydrogenase component is a component of the NiFe hydrogenase from *Synechocystis* sp.

11. A method for the production of hydrogen, wherein at least one phototrophic cell as claimed in claim 1 is cultured in an aqueous medium and/or in a biofilm under light.

12. The method as claimed in claim 11, wherein the phototrophic cell is cultured under anaerobic conditions.

13. The phototrophic cell as claimed in claim 1, wherein at least one of the native PSI components PsaB, PsaC or PsaD has been deleted, and the fusion protein comprises this at least one PSI component, or a functional portion thereof, the functional portion thereof being a N-terminally or C-terminally truncated PSI subunit.

14. The phototrophic cell as claimed in claim 5, wherein the phototrophic cell is genetically modified in a manner such that the hydrogenase components HoxY and HoxH are expressed, and wherein the at least one fusion protein comprises the hydrogenase component HoxY.

15. The phototrophic cell as claimed in claim 1, wherein the phototrophic cell is a cyanobacterial cell of the genus *Synechocystis*.

* * * * *